United States Patent
Rider

(10) Patent No.: US 10,136,626 B1
(45) Date of Patent: *Nov. 27, 2018

(54) HOOK CLASPS FOR FISHING LURES

(71) Applicant: David Rider, Palm Bay, FL (US)

(72) Inventor: David Rider, Palm Bay, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/680,932

(22) Filed: Aug. 18, 2017

Related U.S. Application Data

(60) Continuation-in-part of application No. 15/631,297, filed on Jun. 23, 2017, now Pat. No. 9,814,285, which is a division of application No. 15/381,889, filed on Dec. 16, 2016, now Pat. No. 9,717,225, which is a division of application No. 14/323,540, filed on Jul. 3, 2014, now Pat. No. 9,538,735.

(51) Int. Cl.
*A01K 91/04* (2006.01)
*A44C 15/00* (2006.01)
*A44C 5/20* (2006.01)

(52) U.S. Cl.
CPC ............ *A01K 91/04* (2013.01); *A44C 5/2033* (2013.01); *A44C 15/005* (2013.01)

(58) Field of Classification Search
CPC .............................. A01K 83/00; A01K 91/04
See application file for complete search history.

(56) References Cited

U.S. PATENT DOCUMENTS

| | | |
|---|---|---|
| 24,677 A | 7/1859 | Tschus |
| 79,347 A | 6/1868 | Hayes |
| 187,284 A | 2/1877 | Jones |
| 315,796 A | 4/1885 | Keefe |
| 451,314 A | 4/1891 | White |
| 534,682 A * | 2/1895 | Burgess ............... A01K 83/00 43/43.2 |
| 548,874 A | 10/1895 | Hayward |
| 586,397 A | 7/1897 | Rock |
| 600,441 A | 3/1898 | McCann |
| 691,396 A | 1/1902 | Lovell |
| 745,066 A | 11/1903 | Koch |
| 805,646 A | 11/1905 | Hubbard |
| 853,377 A | 5/1907 | Reid |
| 892,855 A | 7/1908 | Ladd |
| 915,747 A | 3/1909 | Dohan et al. |
| 981,375 A | 1/1911 | Browning |
| 1,050,529 A * | 1/1913 | Fearing ............... A01K 83/00 43/43.13 |

(Continued)

*Primary Examiner* — Jason W San
(74) *Attorney, Agent, or Firm* — Brian S. Steinberger; Law Offices of Brian S. Steinberger, P.A.

(57) ABSTRACT

Spring clasps, devices, apparatus, systems and methods for easily attaching and detaching ends of fishing hooks to fishing lures. The opposite end has a hook with a spring catch for closing the hook clasp and allowing the hook clasp to attach to a loop end of a fishing hook. The spring catch can be formed from a rearward bending tip end with two legs each having bent ends attached to a base of the hook. To open the hook clasp, the rearward bent tip of the spring catch can be pushed away from the hook opening. Next, the loop end of a fishing hook can be attached, and the rearward bent tip can snap back in place. Safety clips can also be used to prevent the fishing hooks from being accidentally removed from the clasps. The clasps can be used for attaching jewelry ends of strands such as chains, bracelets, necklaces and anklets together.

13 Claims, 19 Drawing Sheets

(56) References Cited

U.S. PATENT DOCUMENTS

| | | | | |
|---|---|---|---|---|
| 1,152,894 | A | 9/1915 | Jacobson | |
| 1,191,031 | A * | 7/1916 | Peters | A01K 83/00 43/43.2 |
| 1,207,415 | A | 12/1916 | Kite | |
| 1,308,055 | A | 7/1919 | Durham | |
| 1,308,519 | A | 7/1919 | Baker | |
| 1,311,499 | A | 7/1919 | Darr | |
| 1,332,884 | A | 3/1920 | Bruhn | |
| 1,351,669 | A | 8/1920 | Mansfield | |
| 1,379,133 | A | 5/1921 | Speece | |
| 1,504,802 | A | 8/1924 | Wolf | |
| 1,519,519 | A | 12/1924 | Timbs | |
| 1,522,451 | A | 1/1925 | Hayes | |
| 1,524,844 | A | 2/1925 | Scott et al. | |
| 1,546,701 | A | 7/1925 | Bailer | |
| 1,557,603 | A | 10/1925 | Morrett | |
| 1,580,664 | A | 4/1926 | Graif | |
| 1,608,705 | A | 11/1926 | MacInerney | |
| 1,636,209 | A | 7/1927 | Bergsten | |
| 1,710,102 | A | 4/1929 | Moore | |
| 1,728,560 | A * | 9/1929 | Goshorn | A01K 91/04 24/601.1 |
| 1,738,617 | A | 12/1929 | Scharrer | |
| 1,793,417 | A | 2/1931 | Roberts | |
| 1,910,629 | A | 5/1933 | Navarte | |
| 2,124,822 | A * | 7/1938 | Johnson | A01K 85/02 43/42.28 |
| 2,236,353 | A * | 3/1941 | Minser | A01K 85/16 43/42.05 |
| 2,307,836 | A * | 1/1943 | Heddon | A01K 83/00 43/42.42 |
| 2,540,330 | A * | 2/1951 | Gries | F16B 45/02 24/600.9 |
| 2,570,468 | A * | 10/1951 | Matthes | A01K 83/00 43/43.16 |
| 2,792,663 | A * | 5/1957 | Sinclair | A01K 83/00 43/43.1 |
| 2,843,964 | A * | 7/1958 | Smith | A01K 83/00 403/122 |
| 2,853,827 | A * | 9/1958 | Schwarzer | A01K 83/00 24/68 CD |
| 2,871,540 | A * | 2/1959 | Smith | A01K 91/04 24/600.9 |
| 3,277,549 | A | 10/1966 | Bradshaw | |
| 3,421,249 | A * | 1/1969 | Jeffers | A01K 83/00 43/42.37 |
| 3,497,988 | A * | 3/1970 | Childers | A01K 83/00 43/43.4 |
| 3,760,468 | A * | 9/1973 | Linville | A01K 83/00 24/599.5 |
| 3,855,723 | A * | 12/1974 | McGahee | A01K 91/04 24/598.4 |
| 3,878,637 | A * | 4/1975 | Flower | A01K 83/00 43/44.83 |
| 4,039,220 | A | 8/1977 | Stoops | |
| 4,095,315 | A * | 6/1978 | McGahee | A01K 85/16 24/601.7 |
| 4,112,608 | A * | 9/1978 | McGahee | A01K 85/16 43/42.09 |
| 4,570,373 | A * | 2/1986 | Brief | A01K 83/00 43/43.16 |
| 4,656,699 | A * | 4/1987 | Maahs | A01K 91/04 24/601.3 |
| 4,696,120 | A * | 9/1987 | Schroeder | A01K 91/04 24/601.3 |
| 4,922,645 | A * | 5/1990 | Hannon | A01K 85/02 43/42.4 |
| 5,181,337 | A * | 1/1993 | Dubois | A01K 91/04 24/598.5 |
| 5,299,379 | A * | 4/1994 | Hawk | A01K 91/04 24/607 |
| 5,664,365 | A * | 9/1997 | Walden | A01K 83/00 43/42.13 |
| 5,881,490 | A * | 3/1999 | Richardson | A01K 83/06 43/44.2 |
| 5,884,430 | A * | 3/1999 | Livingston | A01K 83/00 24/599.6 |
| 5,913,479 | A | 6/1999 | Westwood, III | |
| 5,950,348 | A * | 9/1999 | Gruel | A01K 91/04 43/42.49 |
| 6,073,385 | A * | 6/2000 | Sano | A01K 83/00 24/908 |
| 6,560,916 | B1 * | 5/2003 | Maxim | A01K 83/00 43/43.16 |
| 6,631,539 | B1 | 10/2003 | Chang | |
| 6,898,894 | B1 * | 5/2005 | Anderson | A01K 85/00 43/42.39 |
| 6,948,275 | B1 | 9/2005 | Lehmann | |
| 7,614,178 | B2 * | 11/2009 | Hoyt | A01K 85/01 43/42.31 |
| 7,636,990 | B1 | 12/2009 | Choate | |
| 7,694,453 | B1 * | 4/2010 | Arrico | A01K 85/02 43/42.06 |
| 8,020,339 | B1 * | 9/2011 | Carter | A01K 85/00 24/594.1 |
| 8,091,271 | B2 * | 1/2012 | Mayer | A01K 85/16 43/42.09 |
| 8,186,096 | B2 * | 5/2012 | Rubin | A01K 91/04 43/42.39 |
| 8,695,180 | B2 * | 4/2014 | Delle Donne | A01K 91/04 24/580.1 |
| 8,726,563 | B2 * | 5/2014 | Kuhlman | A01K 85/02 43/42.4 |
| 9,538,735 | B1 | 1/2017 | Rider | |
| 9,717,225 | B1 | 8/2017 | Rider | |
| 2001/0029693 | A1 * | 10/2001 | Turner | A01K 83/00 43/43.16 |
| 2003/0182844 | A1 * | 10/2003 | Berthold | A01K 83/00 43/44.83 |
| 2004/0036303 | A1 | 2/2004 | Yu | |
| 2005/0116471 | A1 * | 6/2005 | Muir | A01K 91/04 289/17 |
| 2006/0143973 | A1 * | 7/2006 | Corbitt, III | A01K 83/06 43/44.8 |
| 2006/0156612 | A1 * | 7/2006 | Brzozowski | A01K 91/04 43/43.15 |
| 2006/0260178 | A1 * | 11/2006 | Jones | A01K 85/00 43/42.36 |
| 2007/0119092 | A1 * | 5/2007 | Gruber | A01K 83/00 43/44.83 |
| 2007/0182157 | A1 * | 8/2007 | Carrier | A01K 91/04 289/17 |
| 2007/0227059 | A1 * | 10/2007 | Cox | A01K 91/04 43/25.2 |
| 2009/0199456 | A1 * | 8/2009 | Lutyens | A01K 83/00 43/43.2 |
| 2009/0282725 | A1 * | 11/2009 | Kuhlman | A01K 83/00 43/34 |
| 2016/0235049 | A1 * | 8/2016 | Thorne | A01K 91/04 |

\* cited by examiner

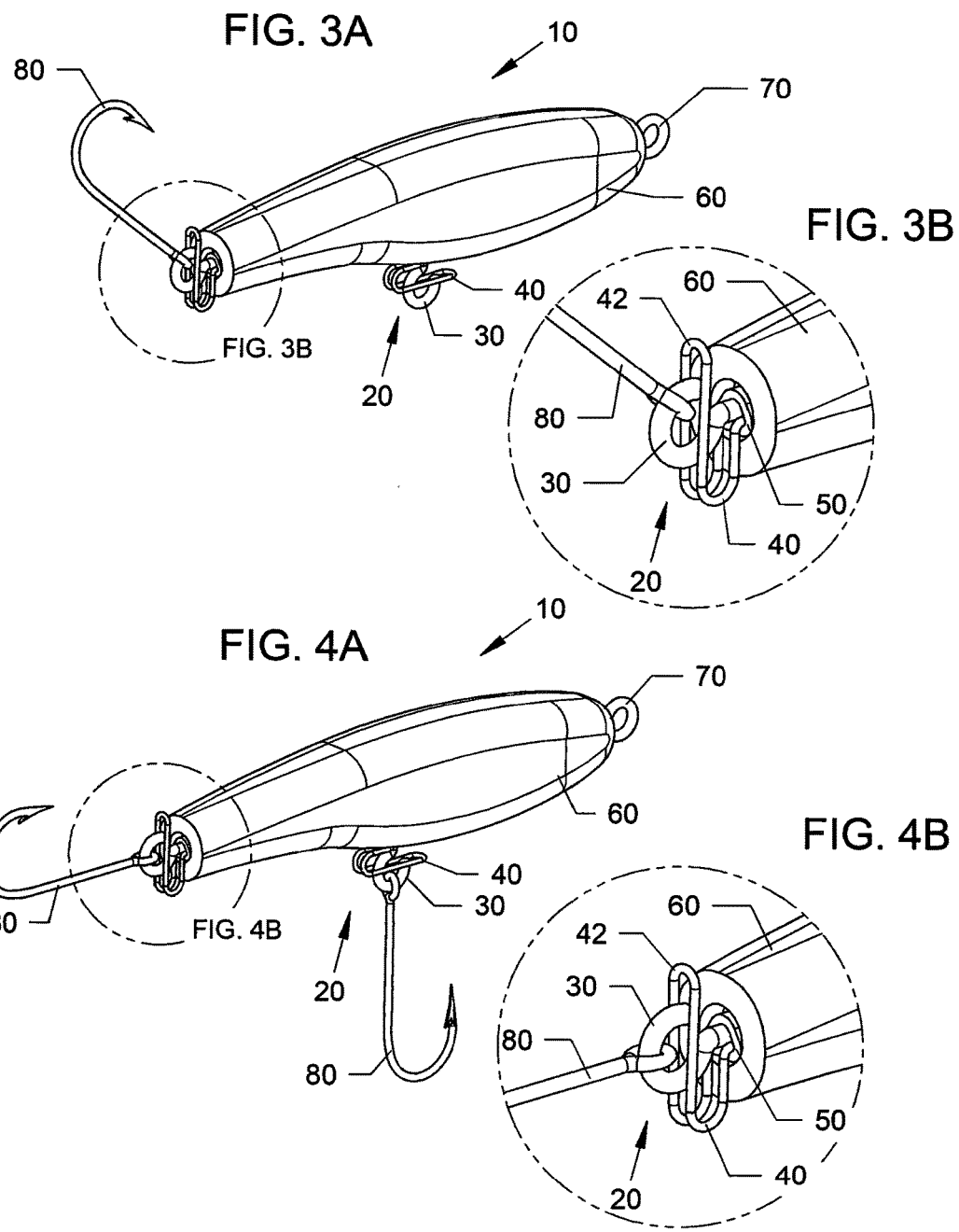

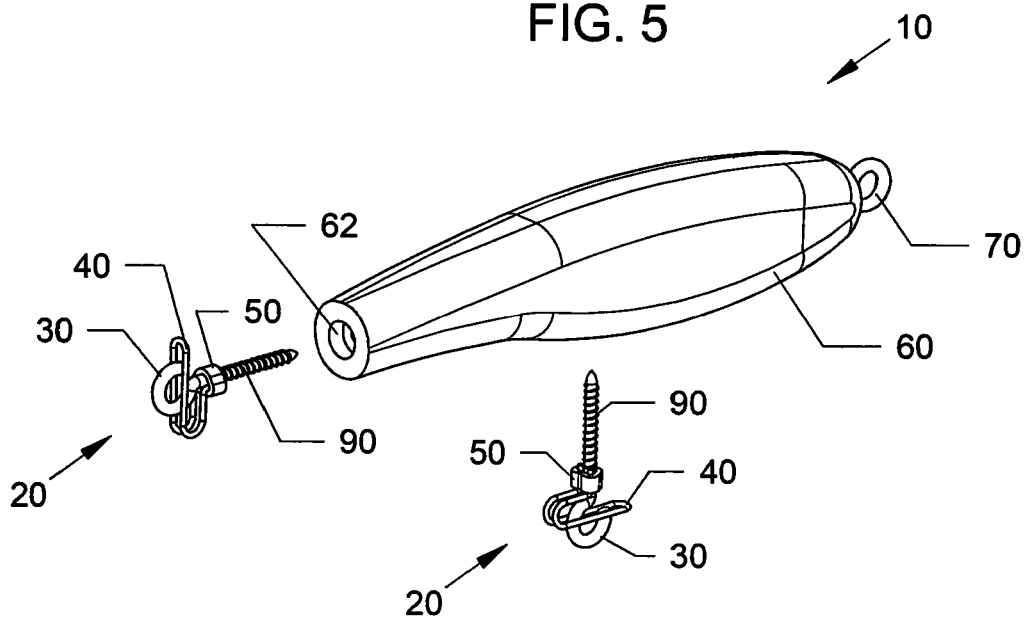
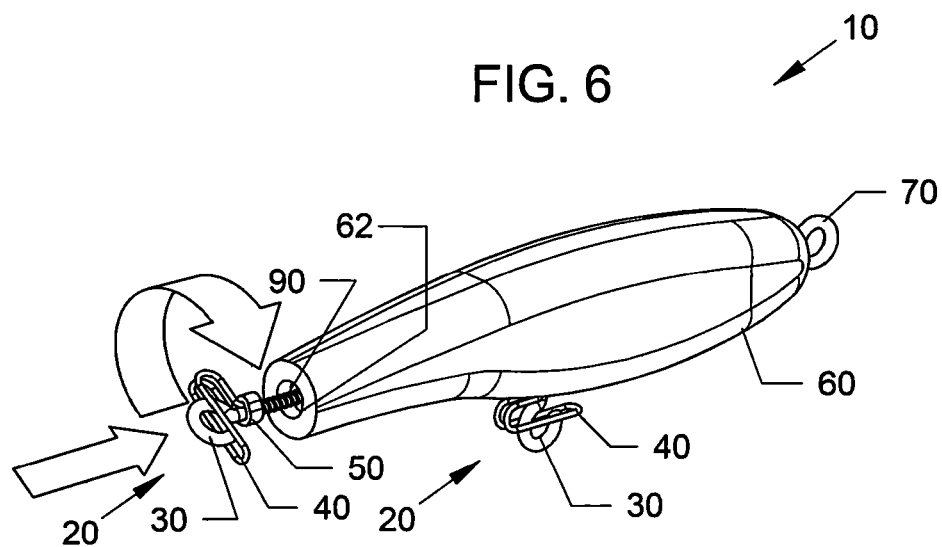

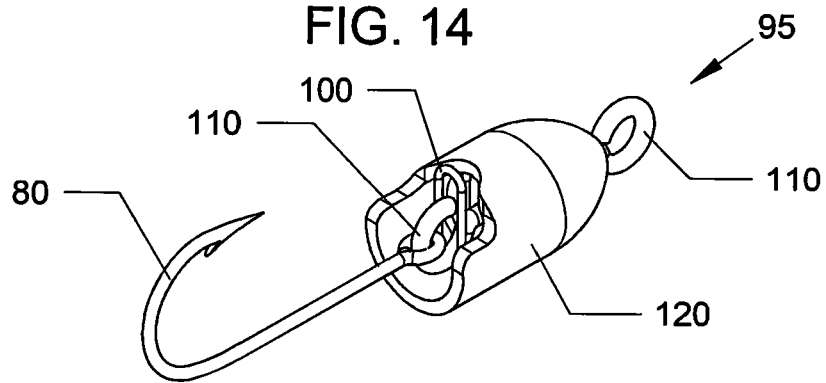
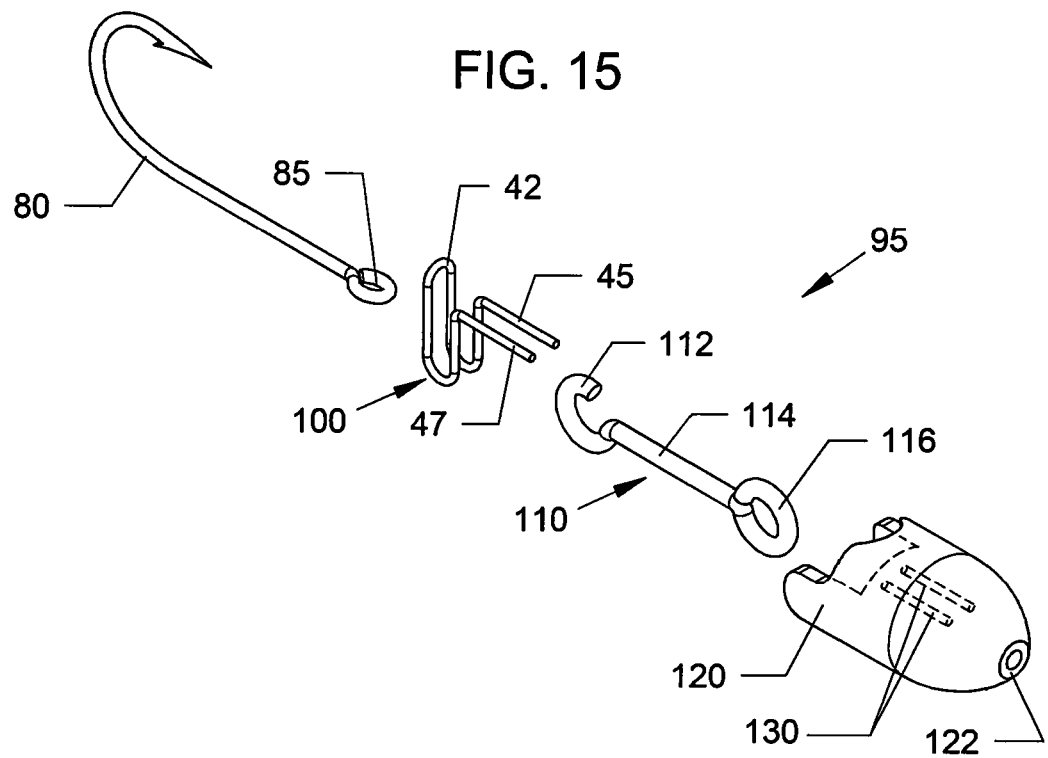

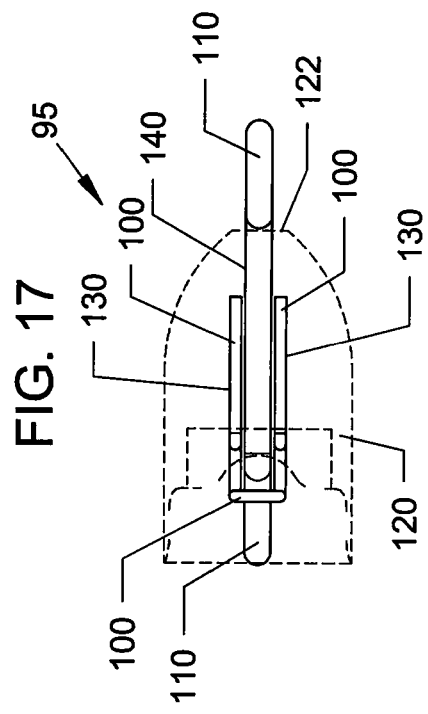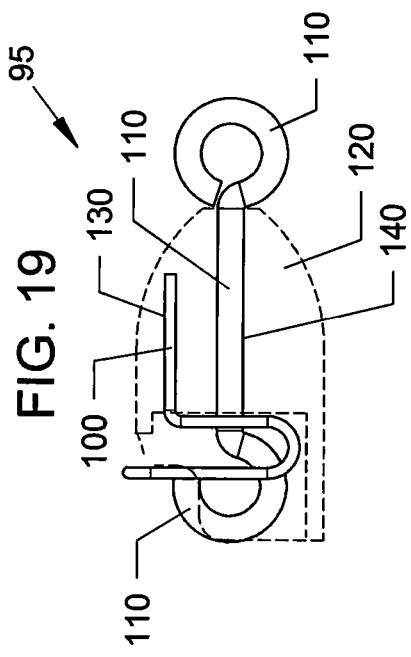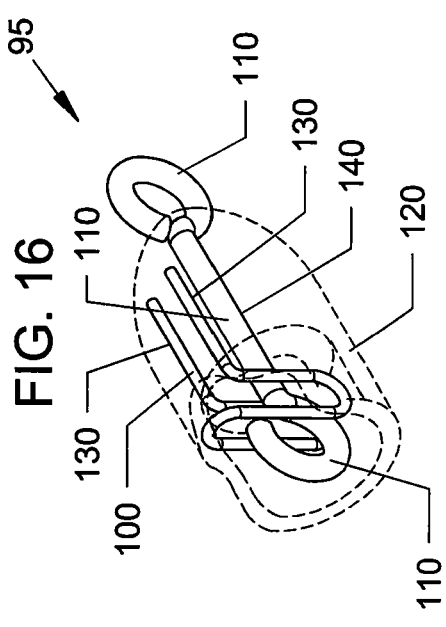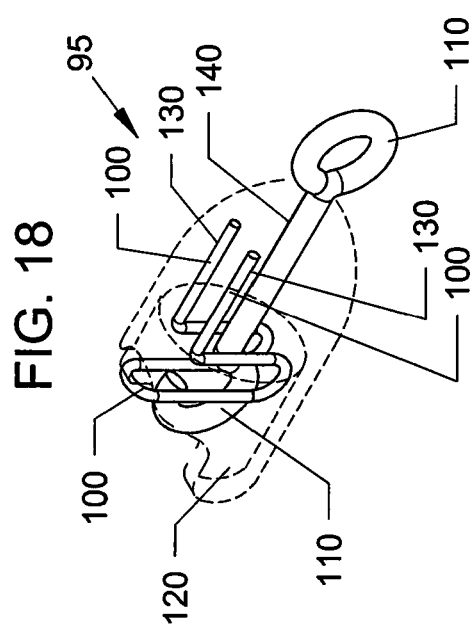

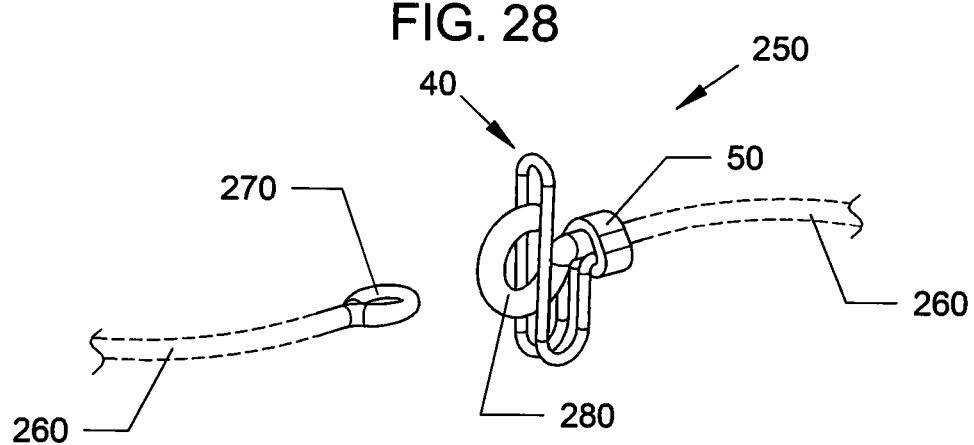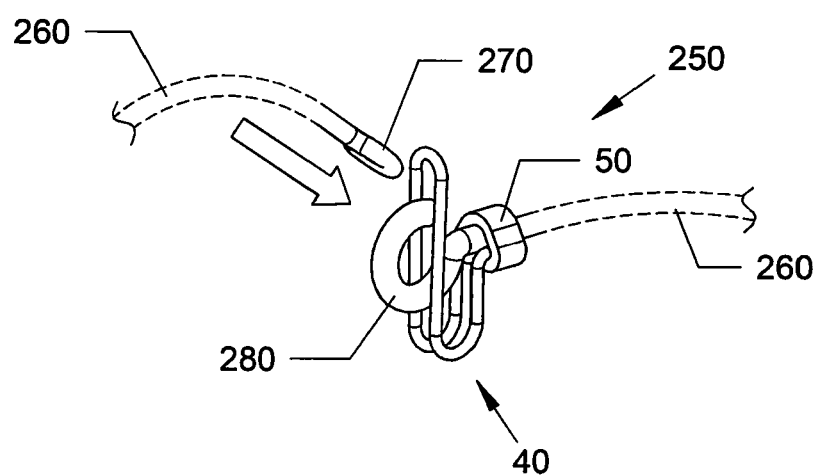

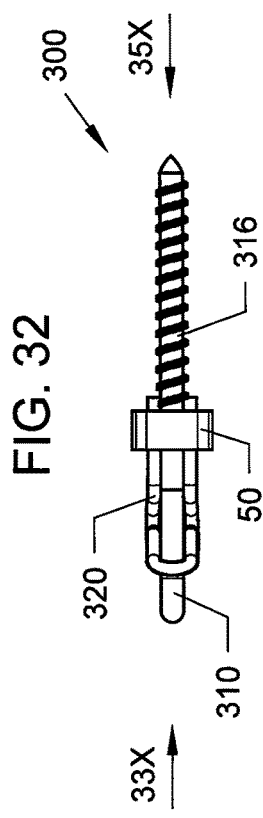
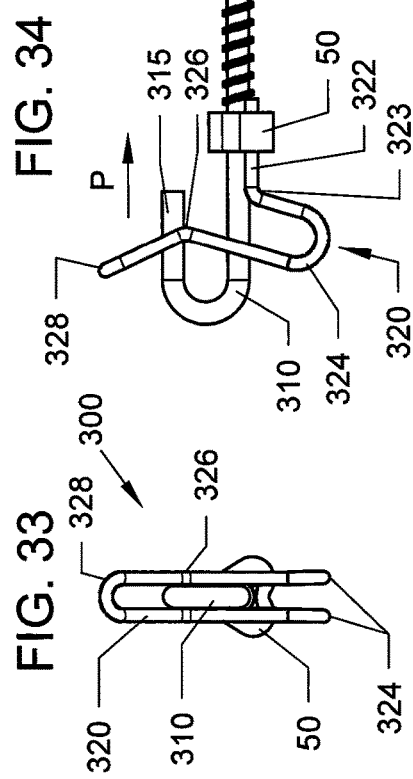
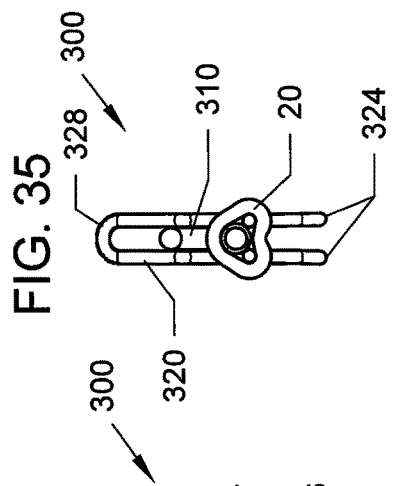
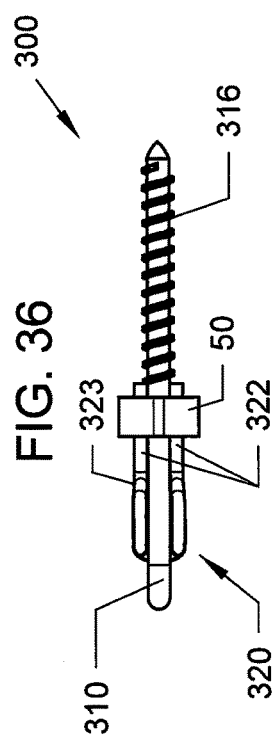

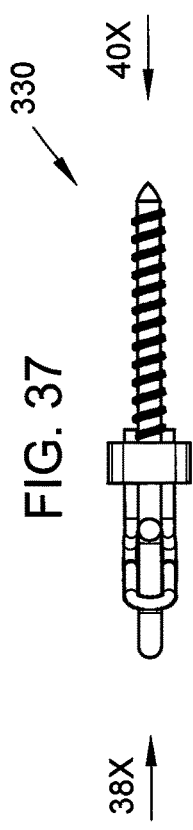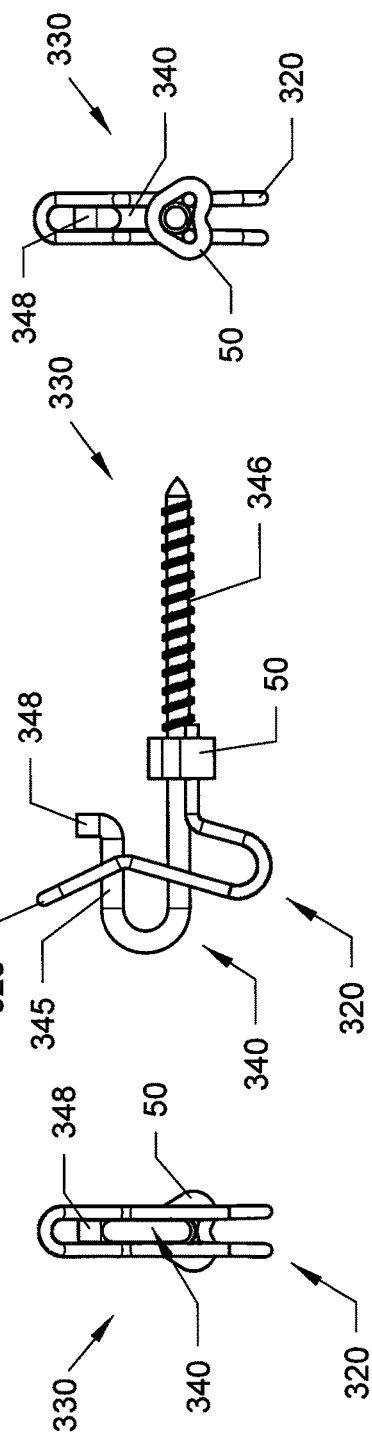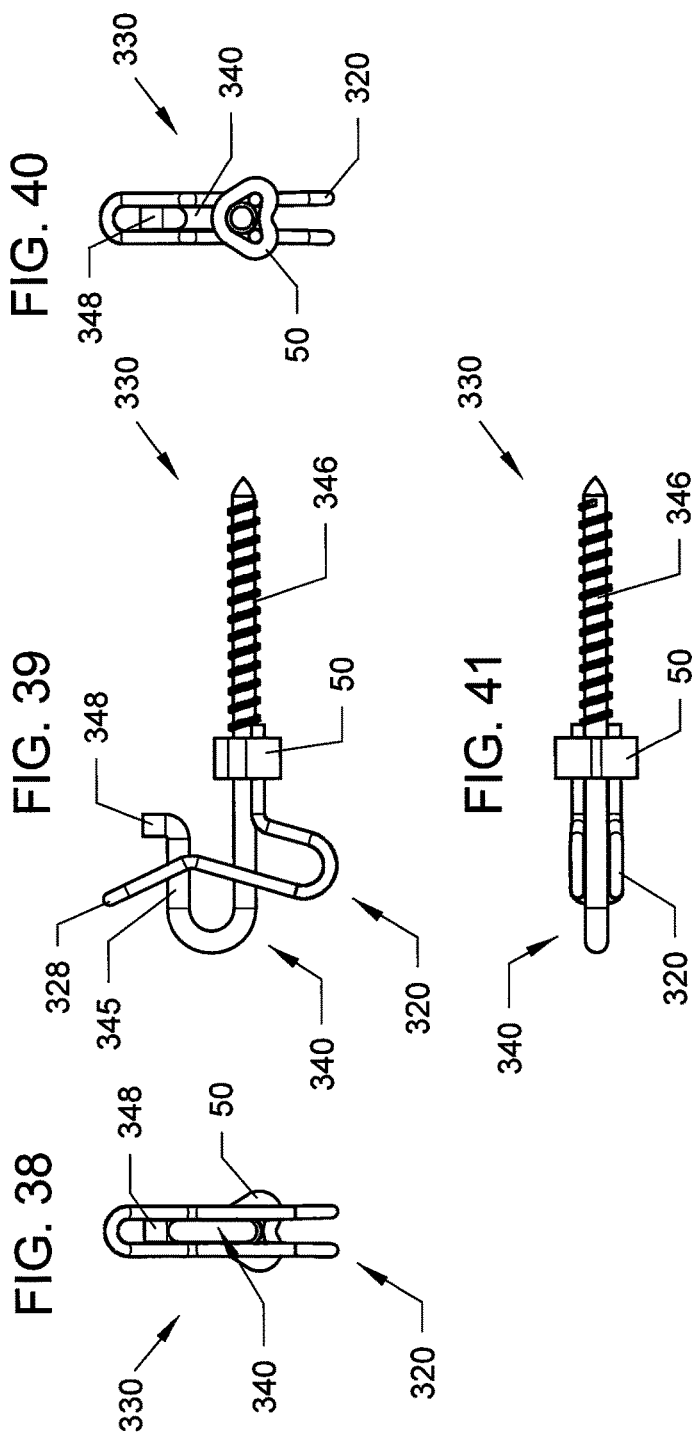

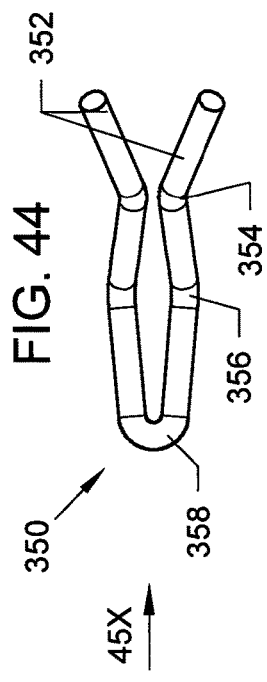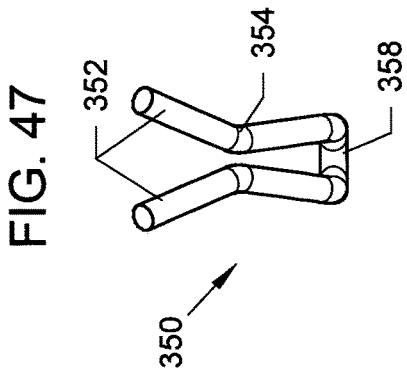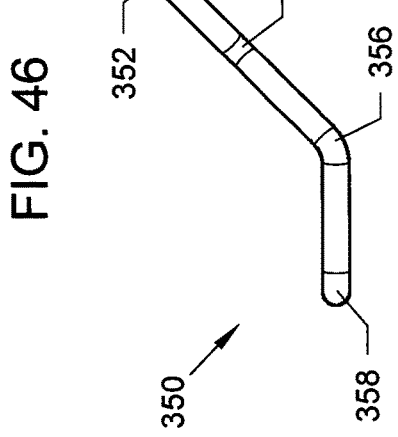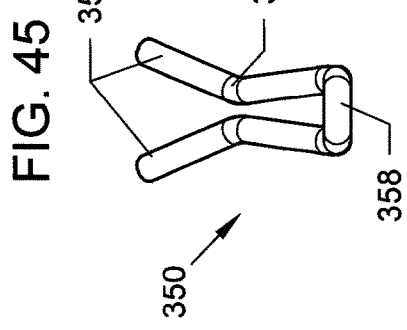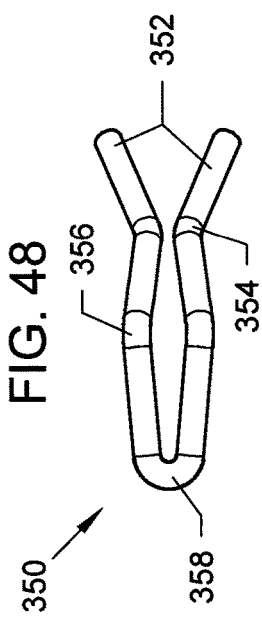

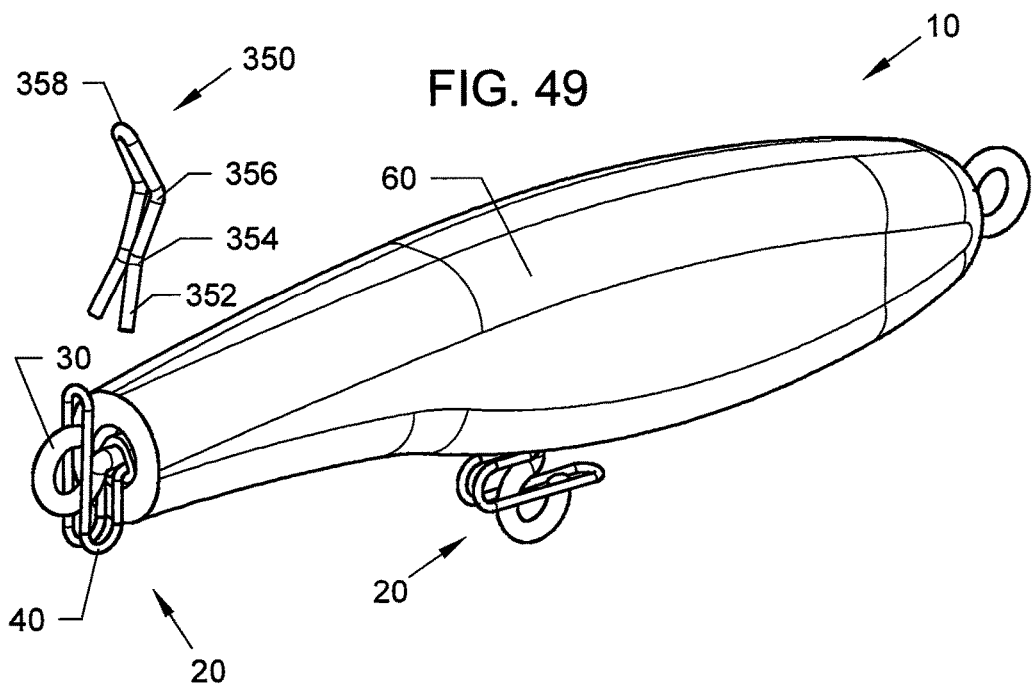
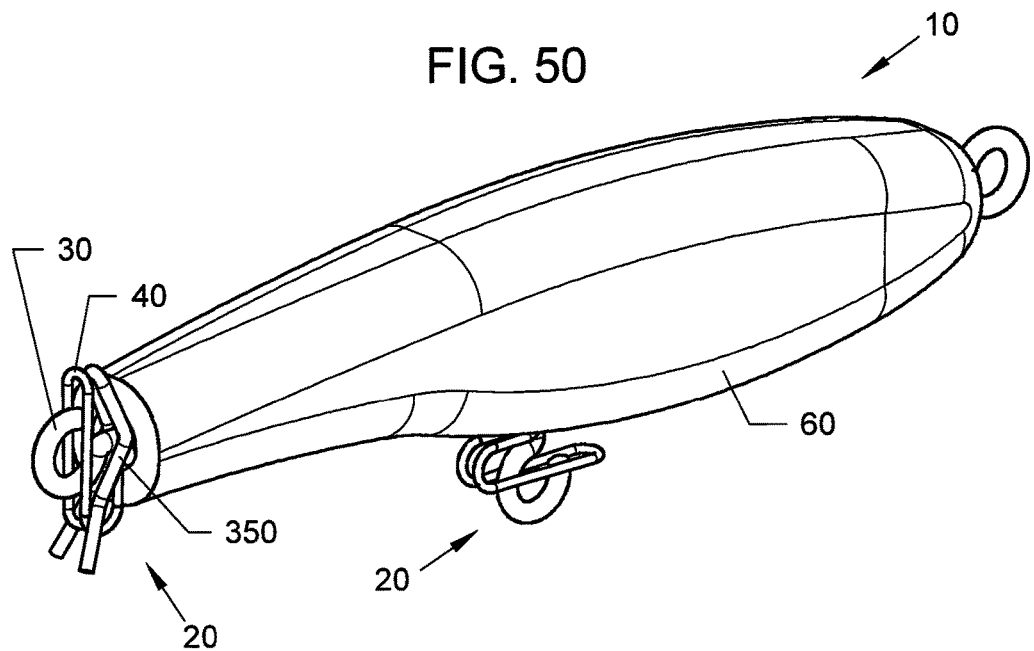

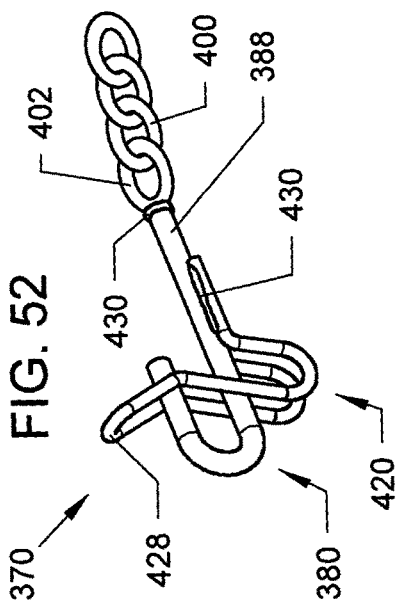
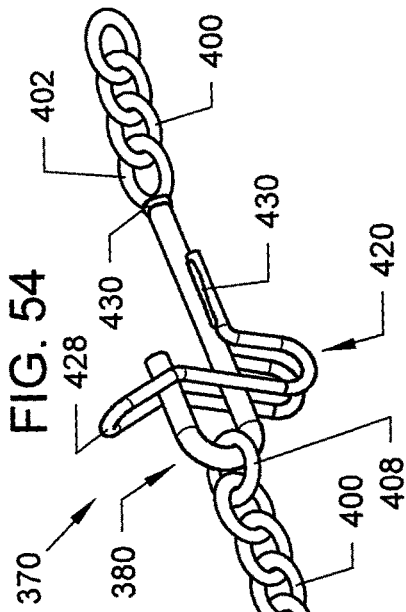
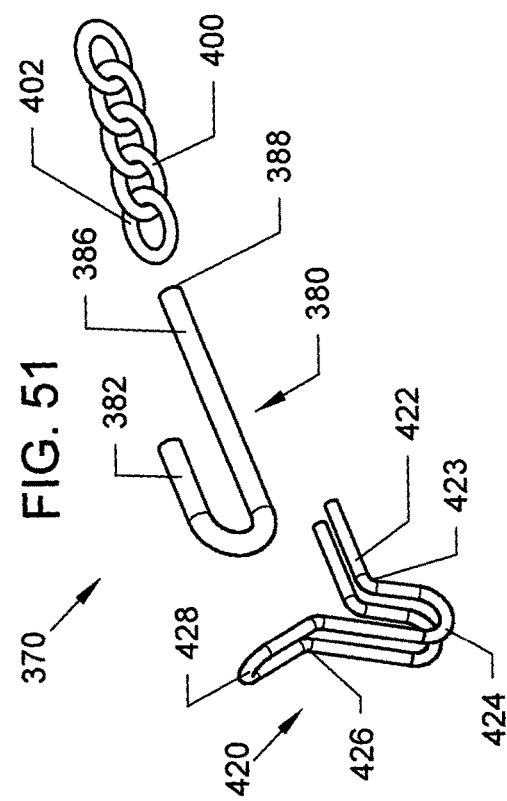
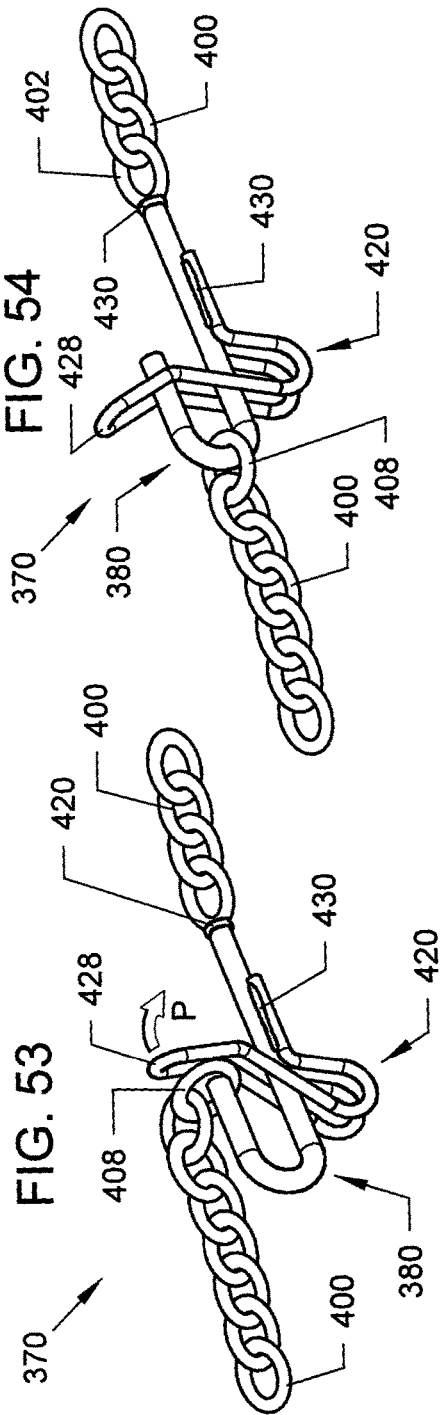

HOOK CLASPS FOR FISHING LURES

CROSS REFERENCE TO RELATED APPLICATIONS

This application is a Continuation In Part of U.S. patent application Ser. No. 15/631,297 filed Jun. 23, 2017, now U.S. Pat. No. 9,814,285, which is a Divisional of U.S. patent application Ser. No. 15/381,889 filed Dec. 16, 2016, now U.S. Pat. No. 9,717,225, which is a Divisional of U.S. patent application Ser. No. 14/323,540 filed Jul. 3, 2014, now U.S. Pat. No. 9,538,735. The entire disclosure of each of the applications listed in this paragraph are incorporated herein by specific reference thereto.

FIELD OF INVENTION

This invention relates to spring clasps, and in particular to hooks and bent metal wires having a spring loaded configuration with or without safety clips forming clasps, devices, apparatus, systems and methods for easily attaching and detaching fishing hooks to fishing lures, as well as attaching and detaching jewelry strands, such as on chains, bracelets, necklaces and anklets together.

BACKGROUND AND PRIOR ART

It is quite common for fisherman to have several fishing lures or more with their fishing gear. And often the fishing lures can cost up twenty dollars or more. Problems that can occur can result around the need to disengage the hook from the lure, which usually requires tools, such as pliers and the like. Often the lures can easily break while trying to change the hooks. Having to replace several lures can start to get costly for the fisherman.

Over the years various types of fishing lure hooks have been used. See for example, U.S. Pat. No. 1,522,451 to Hayes; U.S. Pat. No. 1,546,701 to Bailer; U.S. Pat. No. 1,710,102 to Moore; U.S. Pat. No. 1,738,617 to Schaffer; U.S. Pat. No. 2,124,822 to Johnson; U.S. Pat. No. 2,236,353 to Minser; and U.S. Pat. No. 6,948,275 to Lehmann.

However, these types of prior art generally use a single strand of metal wire forming the clasp with usually one end of the single wire strand closing off an end to form a loop which have problems when used.

For example, the end of the strand in the clasp loop can often pull apart when being used in the water, resulting in the loop becoming open and the hook and/or line falling from the clasp loop. When this occurs the fishing lures and fishing hooks can then become lost, resulting in lost gear which can both expensive and time consuming to replace over time. Additionally, the single loop strands can become bent and lose their spring elasticity from having to be bent back and forth overtime. Still furthermore, the prior art clasps sometimes require extra tools, such as pliers to be used, which can further damage the clasp loops over time. Still furthermore, the sharp tips on the single strands of the clasp loops can easily puncture and injure the person trying to attach or detach the clasp loops overtime.

Other types of clasps exist having a single arm with a separate spring for biasing the arm to close off a clasp opening. See for example, U.S. Pat. No. 79,347 to Hayes; U.S. Pat. No. 1,636,209 to Bergsten; and U.S. Pat. No. 2,540,330 to Gries. Many of these types of clasps generally require a separate spring such as a coil spring at an end of a lever arm where the opposite free end of the lever arm is biased to close off an opening in an open sided loop clasp.

The extra coil spring can add extra expense and manufacturing costs. Additionally, the open end of the lever is generally required to abut against an edge of the open loop clasp in the closed position. Similar to the other prior art clasps the lever arms can often become snagged when used and pulled apart causing the clasp loop to open, resulting in the fishing lures and/or fishing hooks and the like to become lost.

Additionally, most of the clasp loops use metal, that can rust overtime.

Problems also occur with fastening ends of jewelry such, as necklaces or chains together. For example, may necklaces chains use a ring type fastener, having a spring loaded tab for retracting a protruding end to telescope into a base. However, the small size of these existing fasteners is difficult to use, since they generally require a person's nail to pull back the tab.

Additionally, these traditional fasteners are prone to come loose or break over time, and thus are unreliable especially if being used with expensive necklaces, such as gold and silver chains, and the like.

Thus, the need exists for solutions to the above problems with the prior art.

SUMMARY OF THE INVENTION

A primary objective of the present invention is to provide double bent metal wires having a spring loaded configuration forming clasps, devices, apparatus, systems and methods for easily attaching and detaching hooks to fishing lures, jigs, jig heads, feather hooks, fishing lines and the like.

A secondary objective of the present invention is to provide metal wire clasps devices, apparatus, systems and methods for easily attaching and detaching hooks to fishing lures, jigs, jig heads, feather hooks, fishing lines and the like, that is not prone to accidentally coming apart during normal use.

A third objective of the present invention is to provide metal wire clasps devices, apparatus, systems and methods for easily attaching and detaching hooks to fishing lures, jigs, jig heads, feather hooks, fishing lines and the like, that does not have sharp ends which puncture and injure the user.

A fourth objective of the present invention is to provide metal wire clasps devices, apparatus, systems and methods for easily attaching and detaching hooks to fishing lures, jigs, jig heads, feather hooks, fishing lines and the like, that does not require special tools to open and close, such as the need for pliers, and the like.

A fifth objective of the present invention is to provide metal wire clasps devices, apparatus, systems and methods for easily attaching and detaching hooks to fishing lures, jigs, jig heads, feather hooks, fishing lines and the like, that does not require separate spring parts, such as coil springs, and the like.

A sixth objective of the present invention is to provide metal wire clasps devices, apparatus, systems and methods for easily attaching and detaching hooks to fishing lures, jigs, jig heads, feather hooks, fishing lines and the like, that can be formed from stainless steel.

A seventh objective of the present invention is to provide metal wire clasps devices, apparatus, systems and methods for easily attaching and detaching jewelry such as necklaces, bracelets, and chains together.

A clasp for attaching fishing hooks thereto, can include a fixed elongated member having a base end which is fixably attached to a support, and an opposite curved end having a tip, with an opening formed between the tip and the base end of the elongated member, and a spring catch member formed from a single elongated piece of metal, the catch member having a first bent end forming a free end of the catch member, and an opposite bent end from the free end, the opposite bent end which runs to a stem portion attached to the support, wherein the free end of the catch member is biased to close off the opening formed between the tip and the base end of the fixed elongated member, and the free end of the catch member requires substantial pressure to move the free end to an open position to allow for a fishing hook to be attached to the clasp.

The fixed elongated member with the curved end can have a fixed hook shape. The stem portion can extend outward generally midway between the first bent end and the opposite bent end of the catch member.

The free bent end of the catch member can be bent in a different plane from the opposite bent end.

The free bent end of the catch member can be bent in a perpendicular plane to the opposite bent end. The opposite bent end can include two parallel bent ends each attached to the support.

The clasp can further include a ring for attaching end portions of the opposite bent end to the support.

The fixed elongated member and the catch member can each be formed from stainless steel.

The clasp can be pre-attached to a support that is a fishing lure and the base end of the fixed elongated member can have a threaded shaft so that the hook is screwed into an opening in the lure. The clasp can be pre-attached to a support that is a fishing lure and the stem portion is press fit into an opening in the lure.

The support can be a jig head and the stem portion is press fit into an opening in the jig head. The base end of the fixed elongated member can include a loop.

The invention can include a second clasp having a second elongated member with a loop end for attaching about the fixed elongated member, the second elongated member having a hook end, and a second spring catch member formed from a single elongated piece of metal, the second catch member having a first bent end forming a free end of the catch member, and an opposite bent end from the free end, the opposite bent end which runs to a stem portion attached to the support, wherein the free end of the second catch member is biased to close off an opening formed between the tip and base of the hook end of the second elongate member, and the free end of the second catch member requires substantial pressure to move the free end to an open position to allow for a second fishing hook to be attached to the second catch member. The support for the both clasps can include a fishing line.

A method of attaching fishing hooks to lures, can include the steps of providing a hook member a hook end and a base, the hook end having an opening adjacent a tip, providing a spring catch member having a generally T shape with a first bent end and a second bent end opposite the first bent end forming a first leg of the T shape, and a stem portion extending outward therebetween forming a second leg of the T shape, the second leg being substantially perpendicular to the first leg, inserting the base of the hook member into a fishing lure, inserting the second leg of the spring catch member into the fishing lure so that the first leg is initially biased to close off the opening in the hook member in a closed position, pushing the first bent end of the spring catch member toward the lure to open the opening adjacent to the tip of the hook end, inserting a loop end of a fishing hook over the tip, and closing the opening adjacent to the tip by allowing the first bent end to bias back to the closed position.

The second bent end can include a pair of parallel bends, and the stem portion includes a pair of parallel prong portions.

The method can include the step of crimping a portion of the base of the hook member with a portion of the second leg of the catch member with a crimping ring.

The method can include the steps of providing exterior threads on a portion of the base of the hook member and screwing the exterior threads into an opening in the lure.

The method can include the step of press fitting a portion of the second leg of the catch member into an opening in the lure.

A clasp is also disclosed for attaching jewelry strand together, that can include a hook member formed from a single elongated piece of metal, the catch member having a first bent end forming a free end of the catch member, and an opposite bent end from the free end, the opposite bent end which runs to a stem portion adapted to be attached to a first end of a jewelry strand, the jewelry strand selected from at least one of a chain, a bracelet, a necklace and an anklet, and a spring catch member formed from a fixed elongated member having a base end which is fixably attached to the first end of the jewelry strand, and an opposite curved end having a tip, with an opening formed between the tip and the base end of the elongated member, wherein the free end of the catch member is biased to close off the opening formed between the tip and the base end of the fixed elongated member, and the free end of the spring catch member requires substantial pressure to move the free end to an open position to allow for a loop end on an opposite end of the jewelry strand to be attached to the hook member.

Further objects and advantages of this invention will be apparent from the following detailed description of the presently preferred embodiments which are illustrated schematically in the accompanying drawings.

BRIEF DESCRIPTION OF THE FIGURES

Screw-In Clasp

FIG. 3A is another perspective view of the screw-in clasp on the lure of FIG. 2A with fish hook loop on the screw-in clasp.

FIG. 3B is an enlarged view of the fish hook loop on screw-in clasp of FIG. 3A.

FIG. 4A is another perspective view of the screw-in clasp on the lure of FIG. 3A with fish hook loop on the screw-in clasp.

FIG. 4B is an enlarged view of the fish hook loop on screw-in clasp of FIG. 4A.

FIG. 5 is an exploded perspective view of the screw-in clasps separated from the lure of the preceding figures.

FIG. 6 is a perspective view of the end screw-in clasp being screwed into an end of the lure, and the bottom screw-in clasp screwed into the bottom of the lure.

Pressed in Clasp

FIG. 14 is a perspective view of jig head lure with press-in clasp.
FIG. 15 is an exploded view of the components of the jig head and clasp components of FIG. 14.
FIG. 16 is an upper left perspective view of the jig head with press-in clasp of FIG. 14 with jig head lure ghosted to view the interior spring catch detail.
FIG. 17 is a top view of the jig head lure with press-in clasp of FIG. 16.
FIG. 18 is an upper right perspective view of the jig head with press-in clasp of FIG. 16.
FIG. 19 is a side view of the jig head lure with press-in clasp of FIG. 16.

Feed-Through Hook Shaft with Clasps

Figure 20:
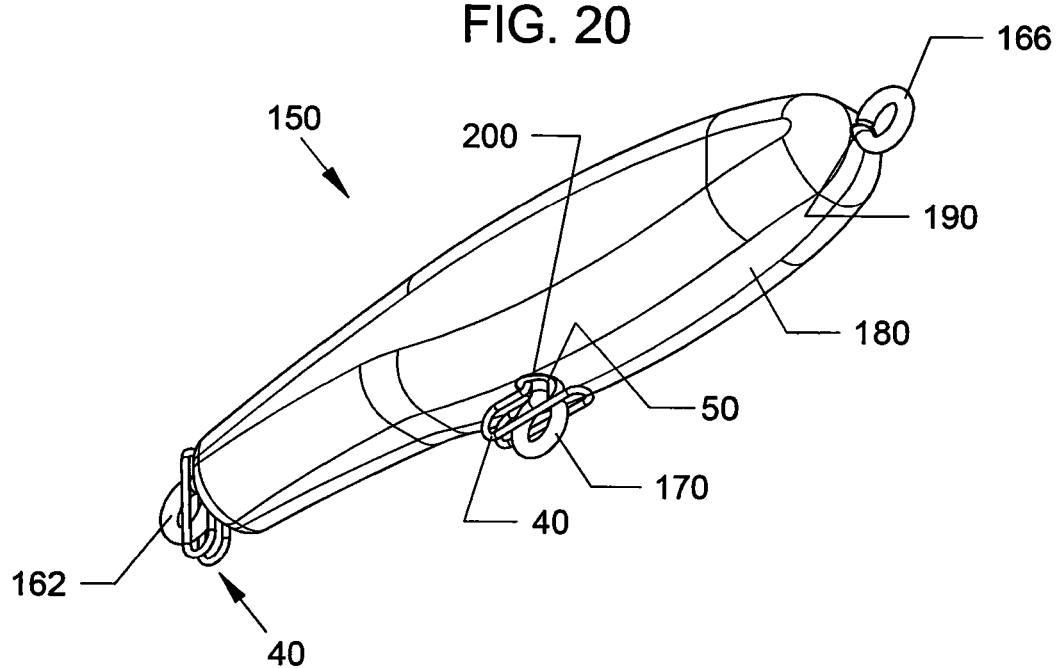
Figure 21:
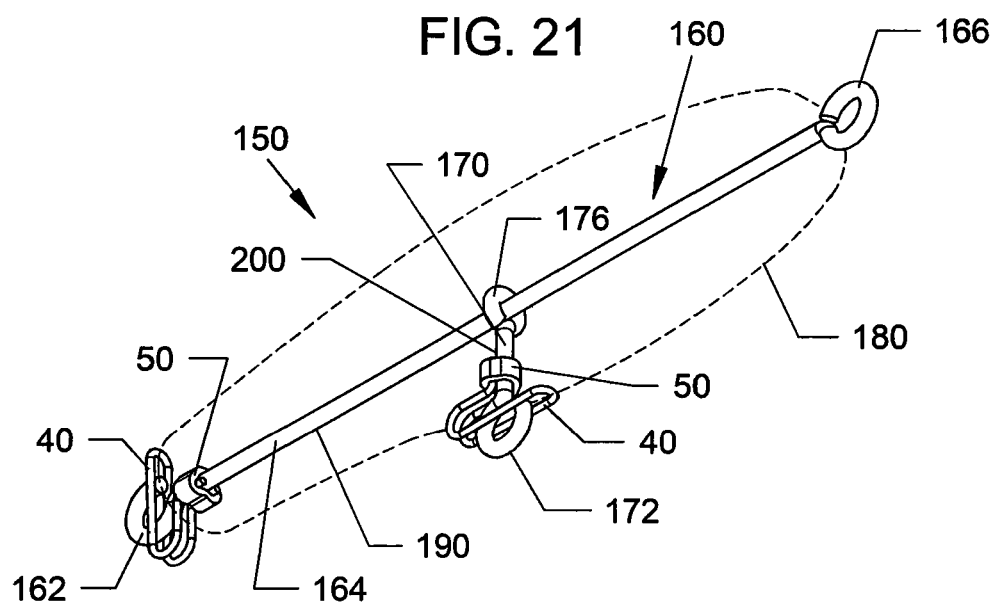
Figure 22:
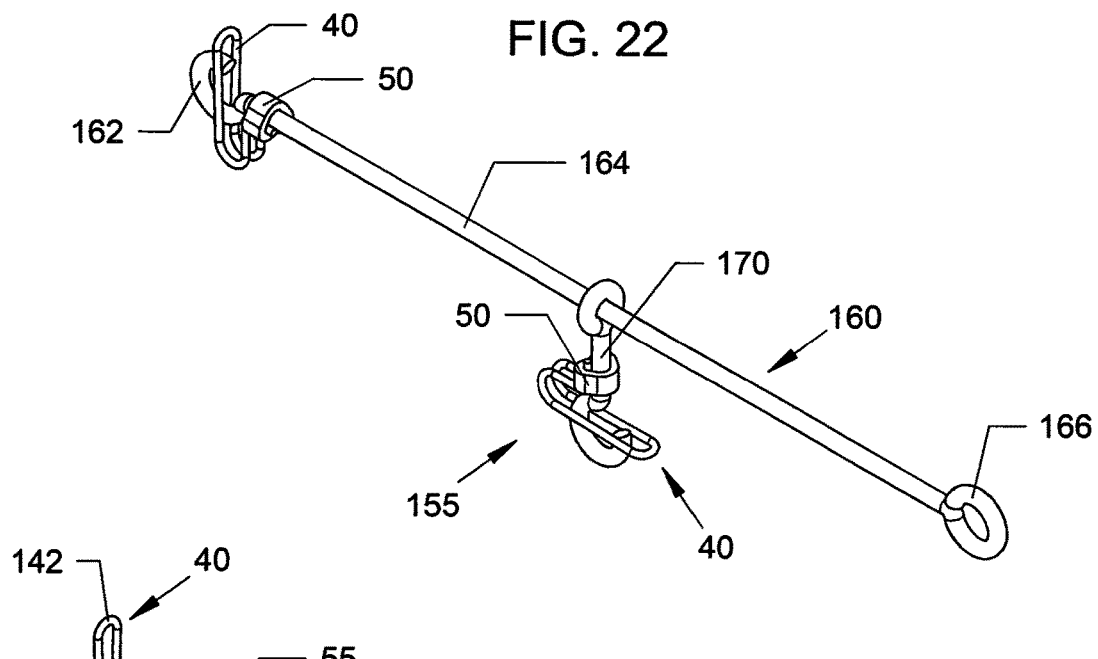
Figure 23:
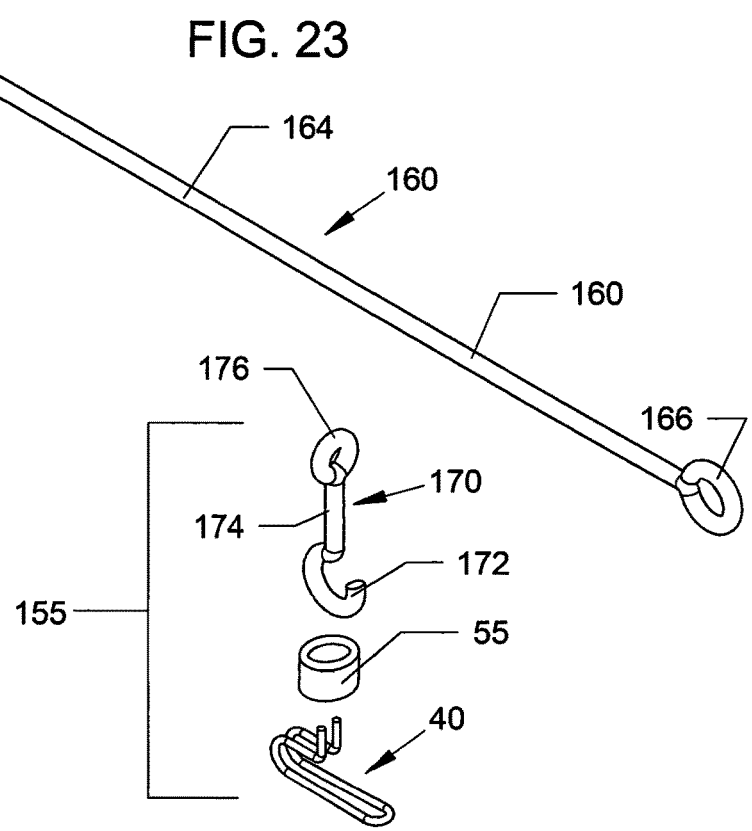

FIG. 20 is a bottom perspective view of a lure with a feed-thru hook shaft with end clasp and bottom auxiliary clasp.
FIG. 21 is another perspective view of the lure with feed-thru hook shaft with end clasp and bottom auxiliary clasp, and lure ghosted to show shaft and clasp detail.
FIG. 22 is a top perspective of FIG. 20 with the feed-thru hook shaft with end clasp and bottom auxiliary clasp, without the lure.
FIG. 23 is an exploded perspective view of the components of the feed-thru hook shaft with end clasp and bottom auxiliary clasp of FIGS. 20-22.

Feed-Through Hook Shaft with Crimp-on Clasp

Figure 24:
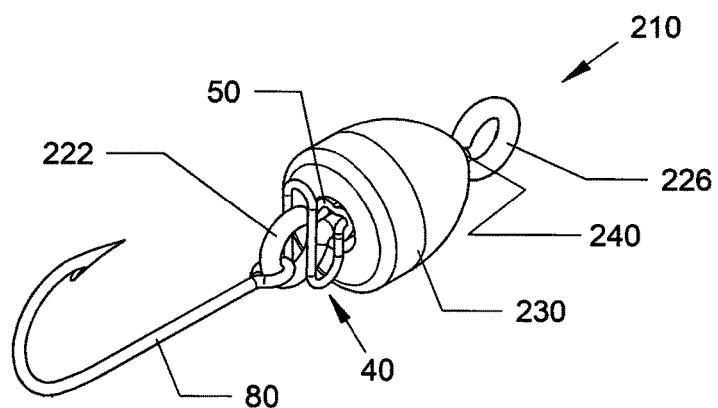
Figure 25:
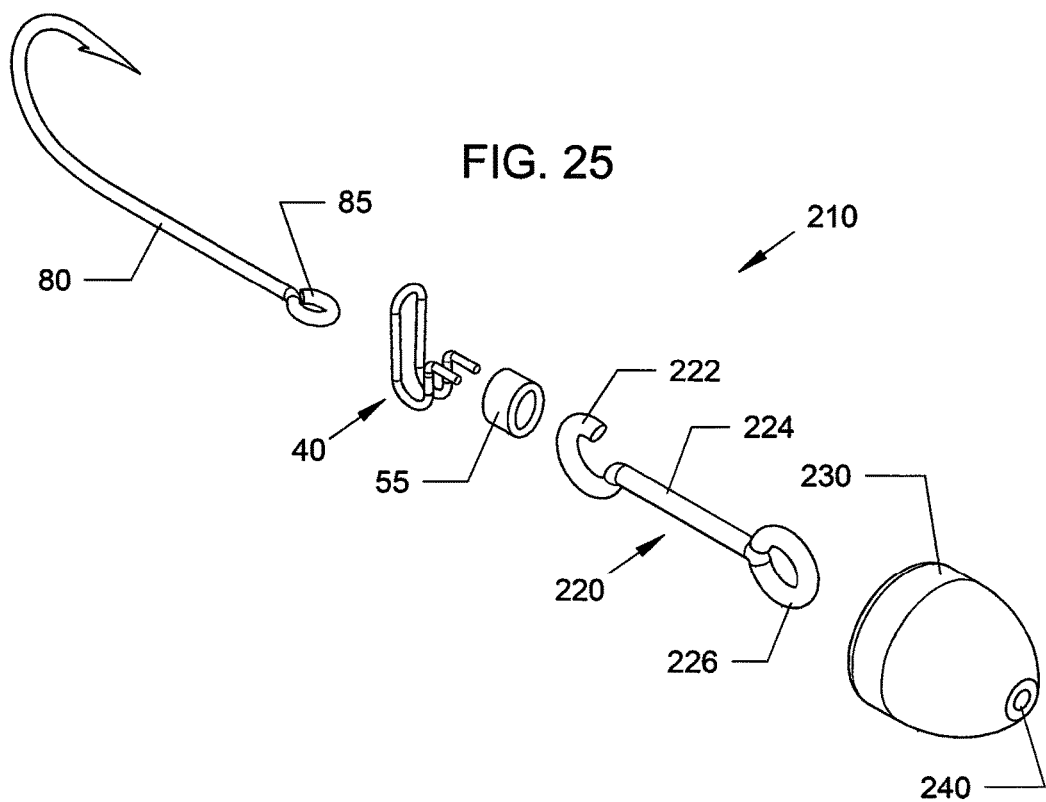
Figure 26:
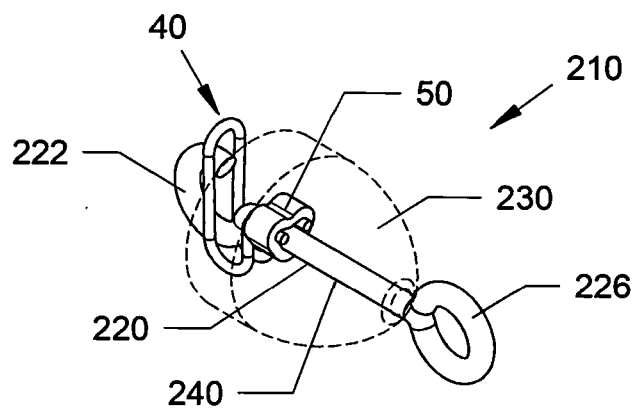
Figure 27:
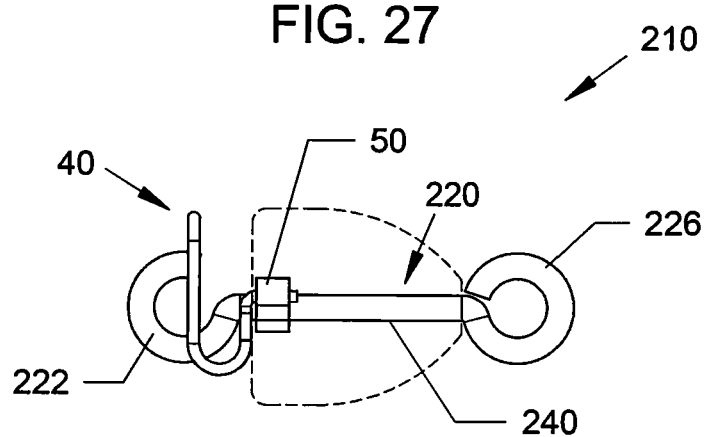

FIG. 24 is a perspective view of a jig head with a feed-thru hook shaft and a crimp-on clasp.
FIG. 25 is an exploded perspective view of the jig head and the feed-thru hook shaft and crimp-on clasp components of FIG. 24.
FIG. 26 is an upper right perspective view of the jig head with a feed-thru hook shaft and a crimp-on clasp of FIG. 24 with the jig head ghosted to show clasp details inside.
FIG. 27 is a side view of the jig head with a feed-thru hook shaft and a crimp-on clasp of FIG. 26.

Jewelry Clasp on Chain/Necklace/Bracelet

Figure 30:
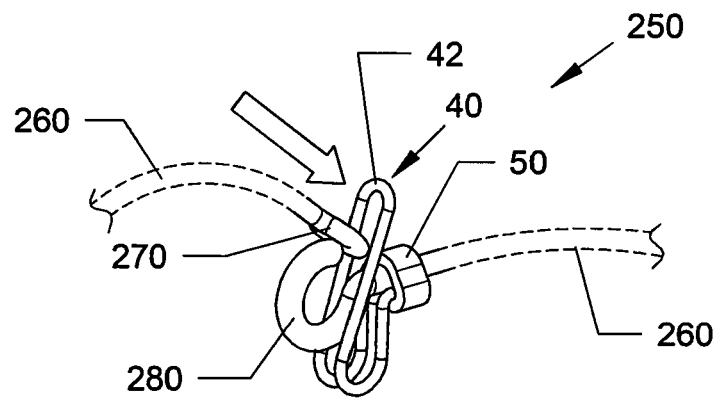
Figure 31:
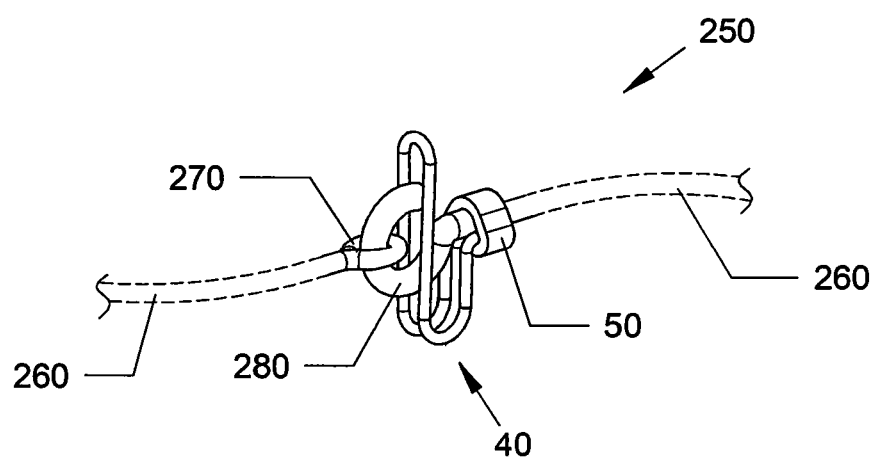

FIG. 28 is a perspective view of a jewelry clasp embodiment of the novel clasp with chain/necklace/bracelet disconnected.
FIG. 29 shows the chain/necklace/bracelet of FIG. 28 with the loop portion of the clasp being positioned for assembly to the hook portion of the clasp.
FIG. 30 shows the chain/necklace/bracelet of FIG. 29 with the loop portion of the clasp flexing the spring catch on the clasp in order to slip the loop over the hook.
FIG. 31 shows the chain/necklace/bracelet of FIG. 28 with the loop fully assembled to the hook.

Improvements to Clasps for Jigs and Jewelry

Figure 42:
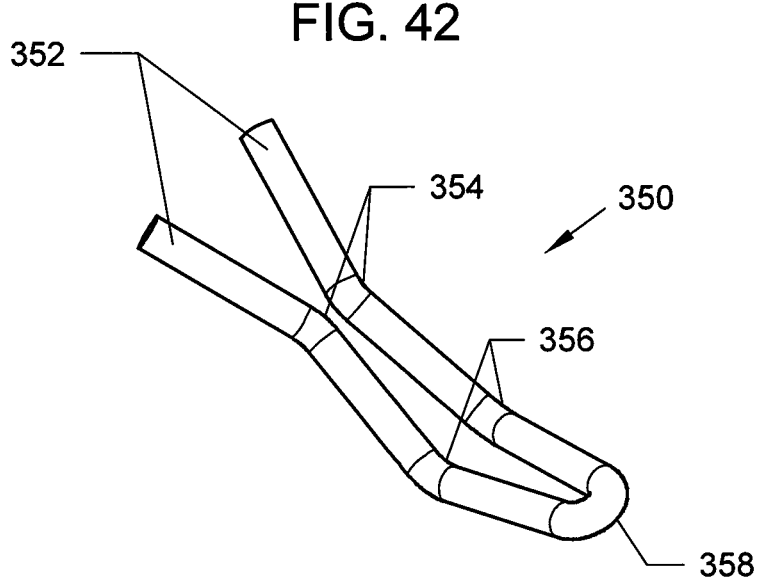
Figure 43:
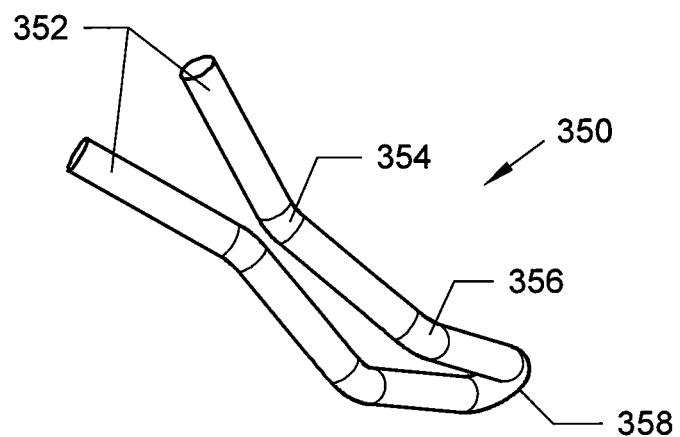

FIG. 32 is a top view of another embodiment of a clasp assembly of a hook with a spring catch having a bent back tip.
FIG. 33 is a left end view of the clasp assembly embodiment of FIG. 32 along arrow 33X.
FIG. 34 is a front view of the clasp assembly embodiment of FIG. 32.
FIG. 35 is a right end view of the clasp assembly embodiment of FIG. 32 along arrow 35X.
FIG. 36 is a bottom view of the clasp assembly embodiment of FIG. 32.
FIG. 37 is a top view of still another embodiment of the clasp assembly of a hook with a raised bent end with a spring catch having a bent back tip.
FIG. 38 is a left end view of the clasp assembly embodiment of FIG. 37 along arrow 38X
FIG. 39 is a front view of the clasp assembly embodiment of FIG. 37.
FIG. 40 is a right end view of the clasp assembly embodiment of FIG. 37 along arrow 40X.
FIG. 41 is a bottom view of the clasp assembly embodiment of FIG. 37.
FIG. 42 is a top perspective view of a safety clip for use with the clasp assemblies of the preceding embodiments.
FIG. 43 is a bottom perspective view of the safety clip of FIG. 42.
FIG. 44 is a top view of the safety clip of FIG. 42.
FIG. 45 is a left end view of the safety clip of FIG. 42 along arrow 45X.
FIG. 46 is a front side view of the safety clip of FIG. 42.
FIG. 47 is a right end view of the safety clip of FIG. 42 along arrow 47X.
FIG. 48 is a bottom view of the safety clip of FIG. 42.
FIG. 49 is a front perspective view of fishing lure of the preceding embodiments using a clasp assembly with the safety clip of FIGS. 42-48 ready to attach.
FIG. 50 is a perspective view of FIG. 49 with the safety clip attached to the clasp.
FIG. 51 is an exploded perspective view of clasp assembly with hook ready to be soldered to an end of a jewelry chain with a spring clasp having the novel bent back tip of FIGS. 32-26.
FIG. 52 is a perspective view of FIG. 51 with the spring catch soldered to a base of hook which is soldered to a jewelry chain end.
FIG. 53 is another perspective view of FIG. 52 with an opposite end of the jewelry chain ready to be attached to the clasp assembly pre-attached to the other end of the jewelry chain.
FIG. 54 is an assembled perspective view of the free end of the jewelry chain now attached to the clasp assembly pre-attached to the other end of the jewelry chain.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation. In the Summary above and in the Detailed Description of Preferred Embodiments and in the accompanying drawings, reference is made to particular features (including method steps) of the invention.

It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1A:
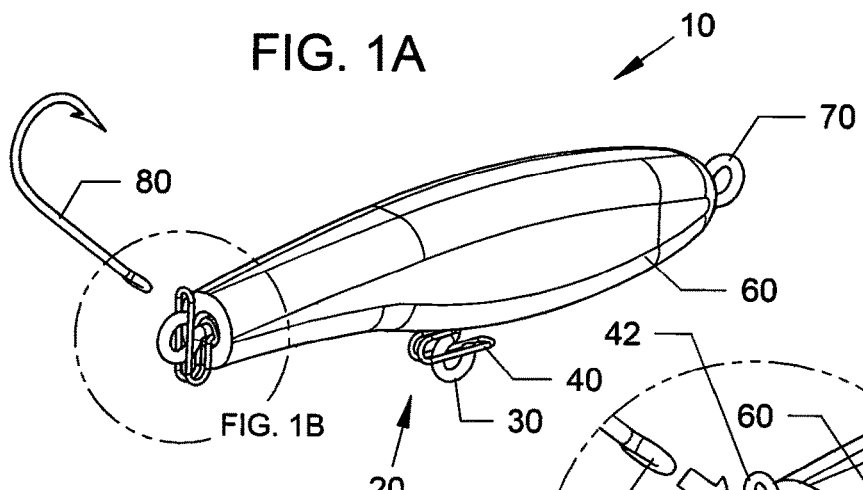
FIG. 1A is a perspective view of the novel screw-in clasp assembled to a lure with fish hook ready to be attached. A fish hook is shown ready to be attached to the lure.
Figure 1B:
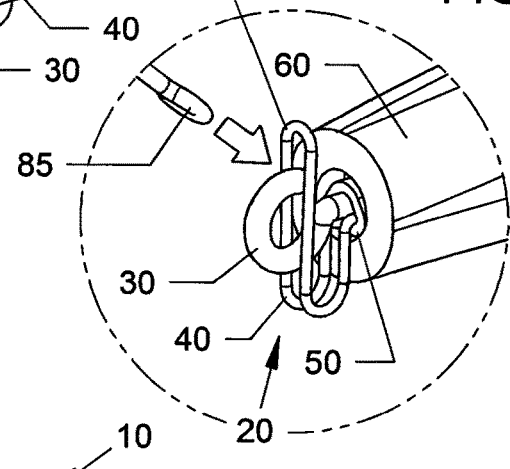
FIG. 1B is an enlarged view of the screw-in clasp of FIG. 1A.
Figure 2A:
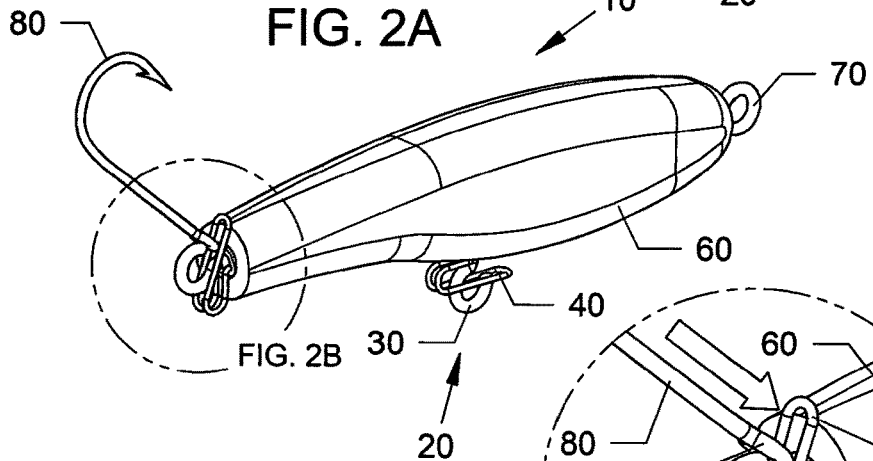
FIG. 2A is another perspective view of the screw-in clasp assembled to the lure of FIG. 1A with fish hook flexing the spring catch in order to slip the loop of the fish hook onto the screw-in clasp.
Figure 2B:
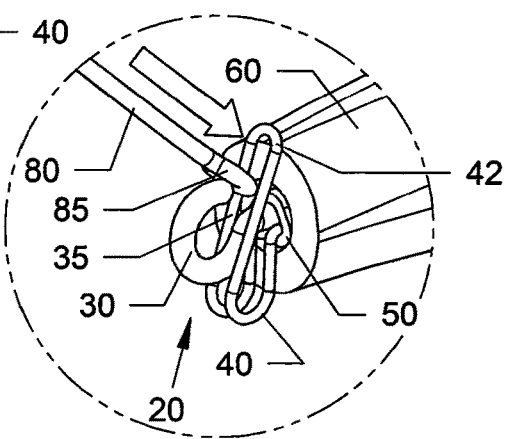
FIG. 2B is an enlarged view of the screw-in clasp of FIG. 2A with hook in the process of being attached.

A list of components will now be described.
10 Lure assembly with screw-in clasp.
20 Screw-in clasp with spring catch snap assembly.
30 Screw-in hook.
32 base of hook
35 opening in hook
40 Crimp style spring catch/hook retainer/hook guard
42 first bent end
43 parallel members
44, 46 opposite bent ends
45, 47 bent stem portions (prongs)
50 Crimp ring (crimped). This part attaches the spring catch to the screw-in hook.
55 Crimp ring (uncrimped).
60 Lure.
62 opening(s) in lure
70 Screw eye
80 Fishing hook
85 loop on fish hook
90 Threaded shaft of screw-in hook.
95 Jig head with press-in spring catch.
100 Press-in style spring catch.
110 Feed thru hook shaft for jig head without spring catch crimp.
112 hook end
114 elongated body
116 loop end
120 Feed thru jig head for press-in spring catch.
122 opening in tip of jig head lure
130 Holes in jig head to accommodate the straight wire portions of the press-in spring catch.
140 Hole in jig head to accommodate the feed thru hook shaft.
150 Lure assembly with feed-thru hook shaft and attached auxiliary snap assembly.
155 Auxiliary clasp assembly.
160 Feed-thru hook shaft for lure.
162 hook end
164 elongated member
166 loop end
170 Auxiliary hook shaft.
172 hook end
174 elongated member
176 loop end
180 Lure with end holes for feed-thru shaft and auxiliary hook shaft.
190 Hole in lure for feed-thru shaft.
200 Hole in lure for auxiliary hook shaft.
210 Lead jig head lure with feed-thru hook shaft and crimped on spring catch.
220 Feed-thru hook shaft for lead jig head with spring catch crimp.
222 hook end
224 elongated member
226 loop end
230 Lead jig head with hole for feed-thru hook shaft.
240 Hole in jig head lure for feed-thru hook shaft.
250 Spring clasp snap system configured for use as a jewelry clasp.
260 chain/bracelet/necklace/anklet,
270 Loop portion of clasp.
280 Hook portion of clasp. The hook employs the same spring catch and crimp as described above.
300 clasp assembly with outwardly bent tip, such as but not limited to screw-in snap assembly
310 hook
315 Straight hook end
316 base shaft, such as but not limited to screw end
320 spring catch
322 parallel stem portions
323 first bends
324 second bends
326 third bends
328 tip end (outwardly bent)
330 clasp assembly, such as but not limited to screw-in snap assembly
340 hook
346 base shaft, such as but not limited to screw end
345 straight hook end
348 Upward bent segment on hook shaft end.
350 Safety clip.
352 outwardly expanding leg ends
354 inwardly angled portions
356 outwardly expanding portions and bends
358 tip of clip
370 clasp assembly with soldered snap assembly for jewelry.
380 hook
382 straight hook end
386 shaft stem
388 end of shaft stem
400 Jewelry chain.
402 first link end
408 second link end
420 spring catch
422 parallel stem portions
423 first bends
424 second bends
426 third bends
428 tip end (outwardly bent)
430 solder points Screw-In Clasp Embodiment FIG. 1A is a perspective view of the novel screw-in clasp assembly 20 assembled to a fishing lure 60 with a fish hook 80 ready to be attached to the lure 60. FIG. 1B is an enlarged view of the screw-in clasp assembly 20 of FIG. 1A. FIG. 2A is another perspective view of the screw-in clasp assembly 20 assembled to the lure 60 of FIG. 1A with fish hook 80 flexing the spring catch 40 in order to slip the loop 85 of the fish hook 80 onto the screw-in clasp assembly 20. FIG. 2B is an enlarged view of the screw-in clasp assembly 20 of FIG. 2A with hook 80 in the process of being attached. FIG. 3A is another perspective view of the screw-in clasp assembly 20 assembled on the lure 60 of FIG. 2A with fish hook loop 85 on the screw-in clasp assembly 20. FIG. 3B is an enlarged view of the fish hook loop 85 on the screw-in clasp assembly 20 of FIG. 3A. FIG. 4A is another perspective view of the screw-in clasp assembly 20 on the lure 60 of FIG. 3A with fish hook loop 85 on the screw-in clasp assembly 20. FIG. 4B is an enlarged view of the fish hook loop 85 on the screw-in clasp assembly 20 of FIG. 4A.

Referring to FIGS. 1A-4B, the user, can grip the fishing hook 80 and push the loop end 85 against the free bent end 42 of the spring catch 40 on the screw-in clasp assembly 20, and with their fingers push the free bent end 42 with pressure until the loop 85 fits over the tip of the hook 30 allowing the loop 85 to pass over the tip of the hook 30 and opening 35 adjacent to the tip of the hook 30. Next, the loop 85 is slipped over the tip of the hook 30 and pulled back away from the hook 30 of the screw-in clasp with spring catch assembly 20. While the loop 85 is slipped over the tip end of the hook 30, the free bent end 42 of the spring catch biases back to its' initial position generally locking the hook 80 to the lure 60. The spring catch 40 functions as a hook retainer and/or hook guard as well. To remove the hook 80, the user can push the free bent end 42 with pressure toward the lure 60 (as shown in FIG. 2B) and remove the hook 80 reversing the above steps.

The lure 60 can be attached to fishing lines not shown by attaching the lines to an eye portion of a screw-in eye 70 on the lure 60.

FIGS. 5-6 shows how the screw-in clasp(s) 20 can be assembled onto a lure 60. FIG. 5 is an exploded perspective view of the screw-in clasp assemblies 20 separated from the lure 60 of the preceding figures. FIG. 6 is a perspective view of the end screw-in clasp assembly 20 being screwed into an end of the lure 60, and the bottom screw-in clasp assembly 20 screwed into the bottom of the lure 60.

Referring to FIGS. 5-6, the end of the threaded shaft 90 of the clasp assembly 20 can be screwed into an opening 62 in one end of the lure 60 and rotated in a clockwise direction until the crimped ring 55 abuts against an edge portion of the lure 60. To disassemble the clasp(s) 20 from the lure 60, the clasp(s) can be rotated counter-clockwise until the threaded shaft(s) 90 of the clasp(s) 20 are fully removed from the lure 60.

Figure 10:
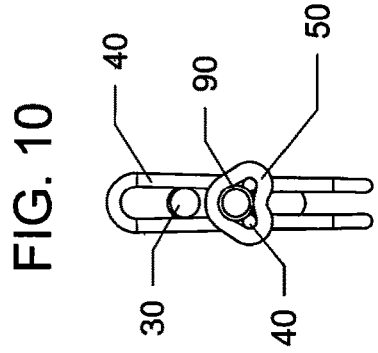
FIG. 10 is a right end view of the screw-in clasp of FIG. 7.
Figure 7:
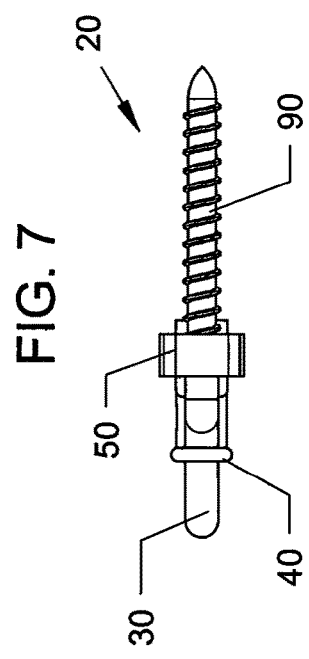
FIG. 7 is a top view of the screw-in clasp used in the preceding figures.
Figure 9:
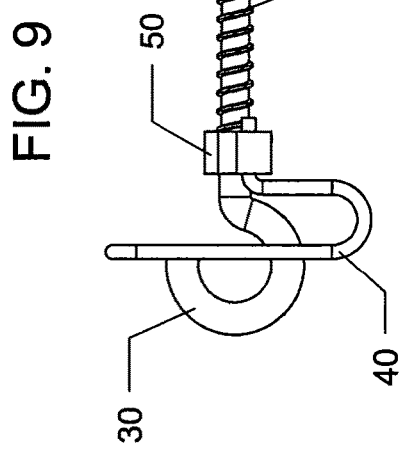
FIG. 9 is a front view of the screw-in clasp of FIG. 7.
Figure 11:
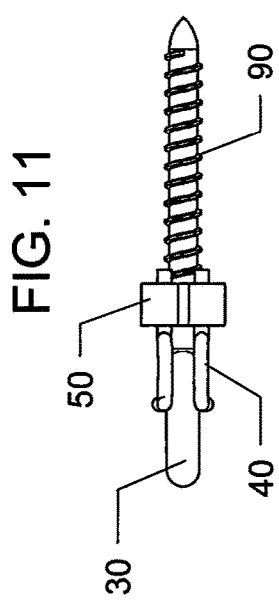
FIG. 11 is a bottom view of the screw-in clasp of FIG. 7.
Figure 8:
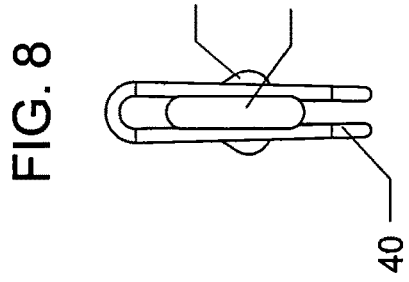
FIG. 8 is a left end view of the screw-in clasp of FIG. 7.
Figure 12:
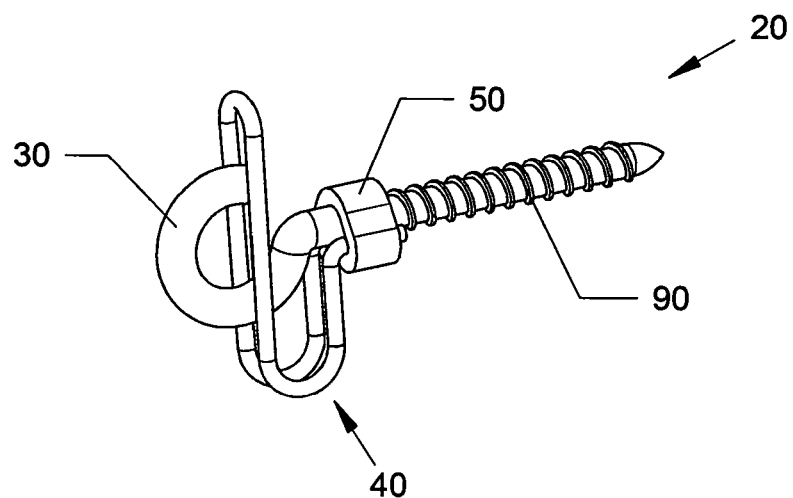
FIG. 12 is an enlarged perspective view of the screw-in clasp of FIG. 7.
Figure 13:
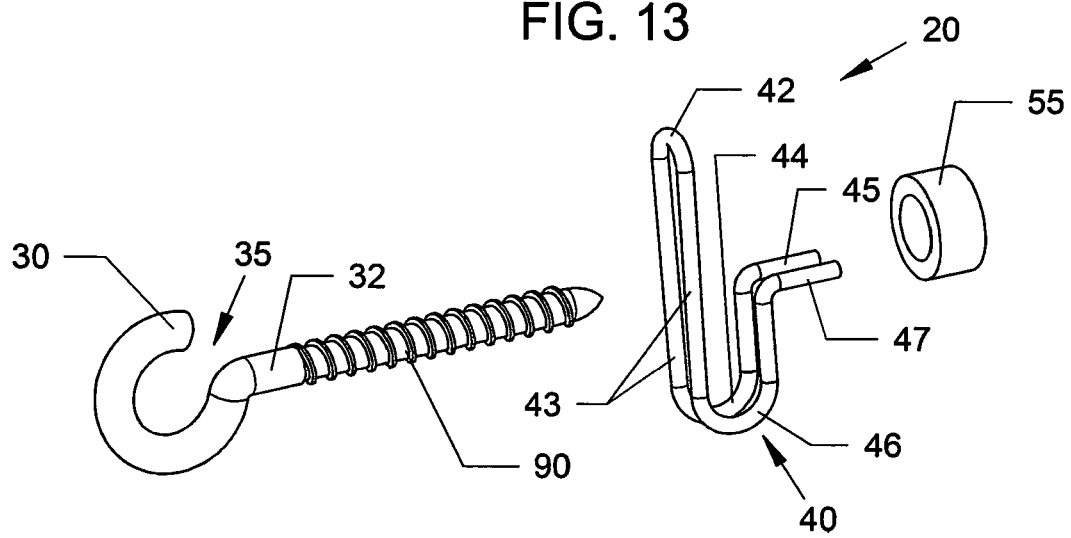
FIG. 13 is an exploded view of the components of the screw-in clasp of FIG. 7.

FIG. 7 is a top view of the screw-in clasp assembly 20 used in the preceding figures. FIG. 8 is a left end view of the screw-in clasp assembly 20 of FIG. 7. FIG. 9 is a front view of the screw-in clasp assembly 20 of FIG. 7. FIG. 10 is a right end view of the screw-in clasp assembly 20 of FIG. 7. FIG. 11 is a bottom view of the screw-in clasp assembly 20 of FIG. 7. FIG. 12 is an enlarged perspective view of the screw-in clasp assembly 20 of FIG. 7. FIG. 13 is an exploded view of the components of the screw-in clasp assembly 20 of FIG. 7.

Referring to FIGS. 7-13, the screw-in clasp assembly 20 includes a component with an elongated threaded shaft 90 with a screw in end, and an opposite end having a base 32 being curved with a hook portion 30 and opening 35, a second component being a spring catch 40, and a third component being a crimp ring 55 which is initially in an uncrimped position.

The spring catch 40 can be formed from a single elongated tubular member having a first bent end 42 forming a free end of the catch 40, the parallel members 43 of the single tubular member form a pair of parallel opposite bent ends 44, 46, each having bent stem portions 45, 47 which extend rearwardly from a portion generally midway between the first bent end and the opposite pair of bent ends 44, 46.

To form the spring clasp assembly 20, the screw in end of the threaded shaft 90 is inserted between the parallel members 43 and above the stem portions 45, 47 through the inside the crimp ring 55. The crimp ring 55 is pushed to abut against the bent portion of the stem portions 45, 47 over the base 32 of the hook portion 30, followed by crimping the crimp ring 55 into a crimped ring 50, which locks hook 30 and threaded shaft 90 to the catch member 40.

Components 30, 90, 40 and 55 can be formed from metal, such as but not limited to stainless steel, and the like. Additionally, the components can be formed from other types of metal, such as but not limited to galvanized metal, aluminum, plastics, compositions of both metal and plastic, and various combinations, and the like.

While the embodiment above describes and shows a screw-in version, the invention can be used with the stem portions 45, 47 of the spring catch 40 pressed into the opening(s) 62 in the lure 60 with a pressed fit attachment, with or without a crimp/crimped ring 50, 55.

Pressed in Clasp Embodiment

FIG. 14 is a perspective view of an embodiment 95 with jig head 120 having a press-in clasp which includes press in catch 100 and feed through hook shaft 110. FIG. 15 is an exploded view of the components of the embodiment 95 of the jig head 120 and clasp components 100, 110 of FIG. 14. FIG. 16 is an upper left perspective view of the jig head 120 with press-in clasp components 100, 110 of FIG. 14 with jig head 120 ghosted to view the interior spring catch 100 detail. FIG. 17 is a top view of the jig head 120 with press-in clasp components 100, 110 of FIG. 16. FIG. 18 is an upper right perspective view of the jig head 120 with press-in clasp components 100, 110 of FIG. 16. FIG. 19 is a side view of the jig head 120 with press-in clasp components 100, 110 of FIG. 16.

Referring to FIGS. 13-19, the press-in clasp components 100, 110 can include a press-in spring catch 100 having a similar configuration to the spring catch 40 in the previous embodiment, where the stem portions 45, 47 form prongs (such as straight wire portions) which can be press fitted into holes (openings) 130 in one end of the jig head 120. The feed through hook shaft 110 does not require a crimp 50, 55. Instead the loop end 116 of the shaft 110 can be located outside the opening 122 on the tip end of the jig head 120 with an interior hole 140 in the jig head 120 to accommodate the elongated body 114 of the feed through shaft 110. The hook end 112 can be accessible in the rear opening of the jig head lure 120. To attach and detach the loop 85 of the fishing hook 80, the user can follow the same assembly and disassembly steps referred to in the previous embodiment.

For example, the user, can grip the fishing hook 80 and push the loop end 85 against the free bent end 42 of the spring catch 100, and with their fingers push the free bent end 42 with pressure until the loop 85 fits over the tip of the hook 30 allowing the loop 85 to pass over the tip of the hook 30 and opening 35 adjacent to the tip of the hook 30. Next, the loop 85 is slipped over the tip of the hook 30 and pulled back away from the hook 30 of the clasp 100. While the loop 85 is slipped over the tip end of the hook 30, the free bent end 42 of the spring catch biases back to its' initial position generally locking the hook 80 to the lure 120. To remove the hook 80, the user can push the free bent end 42 with pressure toward the lure 120 (as shown in FIG. 2B) and remove the hook 80 reversing the above steps.

Feed-Through Hook Shaft with Clasps Embodiment

FIG. 20 is a bottom perspective view of a lure assembly 150 with a feed-thru hook shaft 160 with end clasp (components 40, 50, 160) and bottom auxiliary clasp (components 40, 50 170) assembled with a lure 180. FIG. 21 is another perspective view of the lure 180 with feed-thru hook shaft 160 with end clasp 162, 40, 50 and bottom auxiliary clasp 172, 50, 40, and lure 180 ghosted to show shaft and clasp detail. FIG. 22 is a top perspective of FIG. 20 with the feed-thru hook shaft 160 with end clasp 162, 40, 50 and bottom auxiliary clasp 155, without the lure 180. FIG. 23 is an exploded perspective view of the components of the feed-thru hook shaft 160 with end clasp 162, 40, 50 and bottom auxiliary clasp 155 of FIGS. 20-22.

Referring to FIGS. 15 and 20-23, the lure 180 can include a central hole 190 for allowing the elongated member 164 of the feed-through hook shaft 160 to be positioned inside so that the hook end 162 protrudes from one end of the lure 180 and the loop end 166 protrudes from an opposite end of the lure 180. A clasp assembly formed from the hook end 162 spring catch 40 and crimped ring 50 can be assembled as described in the previous embodiments (where uncrimped ring 55 is crimped into a crimped ring 50). The loop end 166 can attach the lure 180 to fishing lines and the like similar to those described in previous embodiments.

In this embodiment, an auxiliary clasp assembly 155 can be positioned in a hole 200 in the lure 180. The auxiliary clasp assembly 155 can include an auxiliary hook shaft 170 having a loop end 176 which can slide along the elongated member 164 of the feed through hook shaft 160. An elongated member 174 can attach the shaft 170 to a bottom hook 172, which can be formed into another clasp by spring catch 40 and uncrimped ring 55 as described in previous embodiments.

Additional fishing hooks can be attached and detached to the hook ends 162, 172 of their respective clasps as described in the previous embodiments.

Feed-Through Hook Shaft with Crimp-On Clasp Embodiment

FIG. 24 is a perspective view of an embodiment 210 with a jig head 230 with a feed-thru hook shaft 220 and a crimp-on clasp (222, 55, 40). FIG. 25 is an exploded perspective view of the jig head 230 and the feed-thru hook shaft 220 and a crimp-on clasp components 222, 55, 40 of FIG. 24. FIG. 26 is an upper right perspective view of the jig head lure 230 with a feed-thru hook shaft 220 and a crimp-on clasp 222, 40, 50 of FIG. 24 with the jig head 230 ghosted to show clasp details inside. FIG. 27 is a side view of the jig head 230 with a feed-thru hook shaft 220 and a crimp-on clasp 222, 55, 40 of FIG. 26.

Referring to FIGS. 15 and 24-27, the clasp components 40, 55, 22 can be assembled similar to the clasp components of the previous embodiments (uncrimped ring 55 can become a crimped ring 50). The shaft 220 can have a hook end 22 inside of a hole 240 in a jig head 230 with the clasp components 40, 50, 222 extending rearwardly from the jig head 230, and the loop end 226 extending out from a tip end of the jig head 230, which can be fastened to fishing lines as described in previous embodiments.

The fishing hook 80 can be attached and detached to the assembled clasp 222, 40, 50 similar to the steps described in the previous embodiments.

Jewelry Clasp on Chain/Necklace/Bracelet/Anklet Embodiment

FIG. 28 is a perspective view of a jewelry clasp embodiment 250 of the novel clasp with chain/necklace/bracelet/anklet 260 disconnected. FIG. 29 shows the chain/necklace/bracelet 260 of FIG. 28 with the loop portion 270 of the clasp being positioned for assembly to the hook portion 280 of the clasp. FIG. 30 shows the chain/necklace/bracelet/anklet of FIG. 29 with the loop portion 270 of the clasp flexing the spring catch 40 on the clasp in order to slip the loop 270 over the hook 280. FIG. 31 shows the chain/necklace/bracelet/anklet 260 of FIG. 28 with the loop 270 fully assembled to the hook 280.

Referring to FIGS. 13 and 28-31, the novel clasp components 280, 40 and 50 can be used with attaching and detaching jewelry chains/necklaces/bracelets/anklets 260. The loop end 270 can attach and detach to the hook end 280 similar to the steps described in the previous embodiments. The novel clasp components offer an improved clasp that would not become accidentally opened or become easily broken over time which occurs with prior art clasps used for most jewelry chains/necklaces/bracelets/anklets 260.

Although the novel clasps show and describe attaching hooks to the clasps, the invention can be used to attach loop ends of other fishing components, such as for attaching lures to fishing lines, or lures to each other, and the like. Different fishing line attachments such as lures and/or feathered hooks and/or jigs, and/or jig heads can be interconnected with one another by using the novel clasps.

Additionally, the invention can be used with the novel clasps attached to ends of fishing lines for directly attaching fishing hooks and/or lures to the fishing lines.

Although some embodiments reference using crimp rings to attach some components together, other types of fastening techniques, such as but not limited to using metal nuts, welding parts together, soldering parts together and the like.

Improvements to Clasps for Jigs and Jewelry

FIG. 32 is a top view of another embodiment of a clasp assembly 300 of a hook 310 with a spring catch 320 having a bent back tip end 328. FIG. 33 is a left end view of the clasp assembly embodiment 300 of FIG. 32 along arrow 33X. FIG. 34 is a front view of the clasp assembly embodiment 300 of FIG. 32. FIG. 35 is a right end view of the clasp assembly embodiment 300 of FIG. 32 along arrow 35X. FIG. 36 is a bottom view of the clasp assembly embodiment 300 of FIG. 32.

Referring to FIGS. 32-36, the clasp assembly 300 can include a hook 310 having a straight hook end 315 with a base shaft 316 such as but not limited to a screw end. A spring catch 320 can be formed from a single elongated piece of metal, such as but not limited to a wire. The spring catch 320 can include parallel stem portions 322 each having a free end. Each parallel stem portion 322 can each have a downward bend 323, followed by generally straight portions (which can be approximately perpendicular (approximately 90 degrees), or between approximately 80 and approximately 110 degrees), which leads to upward bends 324 which leads to straight portions followed by rearwardly bends 326 followed by straight portions to the tip end 328. The angle of the rearwardly bends 326 can be approximately 30 degrees to approximately, 60 degrees, or approximately 45 degrees. The tip end 328 being bent in a direction away from the shaft 316. The parallel stem portions 322 can be attached to shaft 316 with a fastener 50, that can include but is not limited to a crimp ring, and the like.

The novel clasp assembly 300 can be used with any of the lures previously described. The bent back tip 328 provides enhanced securing over the previous clasp assemblies and reduces the chances of accidental release of the hooked on lures, fishing hooks. Additionally, the bent back tip 328 can be more easily pulled or pushed in the direction of arrow P for allowing the clasp assembly to attached to the lures, fishing hooks, and the like. After the fishing hook is attached, the tip 328 can snap back in place.

Similarly, the bent back tip 328 provides enhanced securing over the previous clasp assemblies and reduces the chances of accidental release of jewelry strand ends being attached to one another. Additionally, the bent back tip 328 can be more easily pulled or pushed in the direction of arrow P for allowing the clasp assembly for attaching jewelry strand ends to one another.

Although the fastener 50 appears to show a crimp ring, the fastener can be a solder, weld, and the like.

While the base shaft 247 is shown as a screw, that can screw into a side of a lure, and the like, the base shaft can be a wire through, such as the embodiments shown in FIGS. 14-27. Additionally, the parallel stem portions 322 with or without the shaft 316 can be press-fit into lure, and the like, shown in FIGS. 14-18.

The novel clasp assembly with bent back tip can be used on any of the fishing lure applications previously described or that will be described later in this application.

The novel clasp assembly with bent back tip can be used with any of the jewelry applications previously described or that will be described later in this application.

Hook with Upward Bent Segment

FIG. 37 is a top view of still another embodiment 330 of the clasp assembly of a hook 340 with a raised bent segment 348 and a spring catch 320 having a bent back tip 328. FIG. 38 is a left end view of the clasp assembly embodiment 330 of FIG. 37 along arrow 38X. FIG. 39 is a front view of the clasp assembly embodiment 330 of FIG. 37. FIG. 40 is a right end view of the clasp assembly embodiment 330 of FIG. 37 along arrow 40X. FIG. 41 is a bottom view of the clasp assembly embodiment 330 of FIG. 37.

Referring to FIGS. 37-41, the clasp assembly 330 can include a similar spring catch 320 as previously described, with a modified hook 340, having an upward bent segment 348 from the straight hook end 345. The upward bent segment 348 can also enhance and reduce the chances of an accidental release of the clasp assembly 330 from a hook, and the like.

The upward bent segment can be used on any of the fishing lure applications previously described or that will be described later in this application.

The upward bent segment can be used with any of the jewelry applications previously described or that will be described later in this application.

While the upward bent segment 348 is shown with the bent back tip 328 on the spring catch 320, the upward bent segment can be used with the hooks shown and described in the previous embodiments.

Safety Clip

FIG. 42 is a top perspective view of a safety clip 350 for use with the clasp assemblies of the preceding embodiments. FIG. 43 is a bottom perspective view of the safety clip 350 of FIG. 42. FIG. 44 is a top view of the safety clip 350 of FIG. 42. FIG. 45 is a left end view of the safety clip 350 of FIG. 42. FIG. 46 is a front side view of the safety clip 350 of FIG. 42. FIG. 47 is a right end view of the safety clip 350 of FIG. 42 along arrow 47X. FIG. 48 is a bottom view of the safety clip 350 of FIG. 42.

Referring to FIGS. 42-48, the safety clip 25 can be formed of a pliable material such as pre-bent or preformed wire, molded plastic and the like, that is both pliable and has a memory to retain its' original shape configuration. The safety clip 350 can include a rounded tip 358 having leg portions that pass to outwardly expanding portions 358 followed by leg portions that angle inward to inwardly angled portions 354, followed by expanding outwardly to two leg ends 352.

FIG. 49 is a front perspective view of fishing lure 10 of the preceding embodiments using a clasp assembly 20 having a hook 30 and spring catch 40 with the safety clip 350 of FIGS. 42-48 ready to be attached.

FIG. 50 is a perspective view of FIG. 49 with the safety clip 350 attached to the clasp 20. After a hook or loop is attached to the clasp assembly 20, the user can attach the safety clip 350 thereon. The leg ends 352 can be positioned to slide over the base of the hook 30 and stem base of the spring latch 40, and pushed downward until the safety clip 350 snaps in place with the outwardly expanding portions 352 clamped about the base of the hook 30 and spring catch 40 of the clasp assembly 20.

With the safety clip 350 in place, accidentally removing the fishing hook or loop connection from the spring clasp 20 will not occur. Removing the safety clip can be accomplished by pulling the tip 358 of the clip 350 upward until the clip 350 is fully separated from the clasp assembly 20.

The safety clip 350 can be used with any of the clasp assemblies for the fishing lures previously described, such as the screw in clasp assembly, wire through clasp assembly and press fit clasp assembly.

Jewelry with Bent Tip on Spring Catch of Clasp Assembly

FIG. 51 is an exploded perspective view of clasp assembly 370 with hook 380 ready to be soldered to an end of a jewelry chain 400 with a spring clasp 420 having the novel bent back tip 428 of FIGS. 32-26. The spring clasp 420 can be formed from a single elongated piece of metal, such as but not limited to a wire formed from steel, stainless steel and the like. The spring catch 420 can include parallel stem portions 422 each having a free end. Each parallel stem portion 422 can each have a downward bend 423, followed by generally straight portions which leads to upward bends 424 which leads to straight portions followed by a rearwardly bends 426 followed by straight portions to the tip end 428. The tip end 428 being bent away from the parallel stem portions 422.

FIG. 52 is a perspective view of FIG. 51 with the spring catch 420 soldered 430 to a base of the hook 380 which is soldered 430 to a link 402 of a jewelry chain 400. Here, the parallel stem portions 422 can be attached to a shaft stem 386 of the hook 380 by being soldered thereto. The shaft stem end 388 can be soldered to a link 402 on one end of a jewelry chain 400.

FIG. 53 is another perspective view of FIG. 52 with an opposite end 408 of the jewelry chain 400 ready to be attached to the clasp assembly 370 pre-attached to the other end 402 of the jewelry chain 400. The user can push the tip end 428 of the spring catch 420 in the direction of arrow P, and slip over the free end link 408 of the jewelry chain 400 over the outer end of the straight end 382 of the hook. The tip end 428 of the spring catch 420 can snap back locking the free link 408 of the chain 400 thereon.

FIG. 54 is an assembled perspective view of the free end 408 of the jewelry chain 400 now attached to the clasp assembly 370 pre-attached to the other end 402 of the jewelry chain 400.

While solder connections are shown, other types of connections, such as but not limited to crimped rings and the like, can also be used.

The terms "approximately" and "generally" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A clasp for attaching fishing hooks thereto, comprising in combination: a clasp hook having an elongated member, the elongated member having a base end with a shaft extending therefrom which is attached to a support, and the elongated member having an opposite curved end having a tip, with an opening formed between the tip and the base end of the fixed elongated member; a spring catch formed from a single elongated member, the catch consisting of a pair of generally vertical members with an outwardly bent free end extending away from the support, the generally vertical members connected to parallel bent portions that connect to a pair of parallel stem portions, the parallel stem portions being generally perpendicular to the pair of parallel bent portions, the pair of parallel stem portions of the spring catch being attached to the support, the generally vertical members each having a longitudinal axis, wherein the outwardly bent free end is approximately 30 degrees to approximately 60 degrees to the longitudinal axis of each of the generally vertical members: and a fishing hook, wherein the free end of the spring catch is biased to close off the opening formed between the tip and the base end of the elongated member of the clasp hook, and the free end of the catch requires pressure to move the free end to an open position to allow for the fishing hook to be attached to the clasp hook and the spring catch.

2. The clasp of claim 1, wherein the support is a fishing lure and the shaft is press fit in the lure.

3. The clasp of claim 1, wherein the support is a jig head lure and the shaft is press fit in the jig head lure.

4. The clasp of claim 1, wherein the support is a fishing lure and the shaft is screwed into the lure.

5. The clasp of claim 1, wherein the support is a fishing lure and the shaft is a wire through into the lure.

6. The clasp of claim 1, wherein the shaft of the clasp hook is attached to the pair of parallel stem portions with soldered.

7. The clasp of claim 1, wherein the shaft of the clasp hook is attached to the pair of parallel stem portions with a crimp ring.

8. The clasp of claim 1, wherein the tip of the curved end of the clasp hook includes: an upwardly bent segment, wherein the upwardly bent segment reduces chances of the clasp hook from being accidentally disengaged from the fishing hook.

9. The clasp of claim 1, further comprising:
a safety clip having a bent end and a pair of parallel legs with outer ends, wherein the outer ends of the parallel legs of the safety clip are slid over the clasp so as to prevent the outwardly bent free end of the spring catch from being moved away from the tip of the curved end of the clasp hook.

10. The clasp of claim 8, wherein the safety clip further includes:
a rounded tip having leg portions that pass to outwardly expanding portions followed by additional leg portions that angle inward to inwardly angled portions followed by expanding outwardly to the outer ends of the parallel legs.

11. A clasp for attaching fishing hooks thereto, comprising in combination: a clasp hook having an elongated member, the elongated member having a base end with a shaft extending therefrom which is attached to a support, and the elongated member having an opposite curved end having a tip, with an opening formed between the tip and the base end of the fixed elongated member; a spring catch formed from a single elongated member, the catch consisting of a pair of generally vertical members with an outwardly bent free end extending away from the support, the generally vertical members connected to parallel bent portions that connect to a pair of parallel stem portions, the parallel stem portions being generally perpendicular to the pair of parallel bent portions, the pair of parallel stem portions of the spring catch being attached to the support; and a fishing hook, wherein the free end of the spring catch is biased to close off the opening formed between the tip and the base end of the elongated member of the clasp hook, and the free end of the catch requires pressure to move the free end to an open position to allow for the fishing hook to be attached to the clasp hook and the spring catch, wherein the tip of the curved end of the clasp hook includes: an upwardly bent segment, wherein the upwardly bent segment reduces chances of the clasp hook from being accidentally disengaged from the fishing hook.

12. A clasp for attaching fishing hooks thereto, comprising in combination: a clasp hook having an elongated member, the elongated member having a base end with a shaft extending therefrom which is attached to a support, and the elongated member having an opposite curved end having a tip, with an opening formed between the tip and the base end of the fixed elongated member; a spring catch formed from a single elongated member, the catch consisting of a pair of generally vertical members with an outwardly bent free end extending away from the support, the generally vertical members connected to parallel bent portions that connect to a pair of parallel stem portions, the parallel stem portions being generally perpendicular to the pair of parallel bent portions, the pair of parallel stem portions of the spring catch being attached to the support; a fishing hook, wherein the free end of the spring catch is biased to close off the opening formed between the tip and the base end of the elongated member of the clasp hook, and the free end of the catch requires pressure to move the free end to an open position to allow for the fishing hook to be attached to the clasp hook and the spring catch; and a safety clip having a bent end and a pair of parallel legs with outer ends, wherein the outer ends of the parallel legs of the safety clip are slid over the clasp so as to prevent the outwardly bent free end of the spring catch from being moved away from the tip of the curved end of the clasp hook.

13. The clasp of claim 12, wherein the safety clip further includes:
a rounded tip having leg portions that pass to outwardly expanding portions followed by additional leg portions that angle inward to inwardly angled portions followed by expanding outwardly to the outer ends of the parallel legs.

* * * * *